United States Patent
Oota et al.

(10) Patent No.: US 10,494,475 B2
(45) Date of Patent: Dec. 3, 2019

(54) SHEET-MOLDING COMPOUND AND FIBER-REINFORCED COMPOSITE MATERIAL

(71) Applicant: Mitsubishi Chemical Corporation, Chiyoda-ku (JP)

(72) Inventors: Akira Oota, Chiyoda-ku (JP); Masahiro Ichino, Chiyoda-ku (JP); Takuya Teranishi, Chiyoda-ku (JP); Tooru Kondou, Chiyoda-ku (JP); Mitsuru Kutsuwada, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/572,820

(22) PCT Filed: May 13, 2016

(86) PCT No.: PCT/JP2016/064367
§ 371 (c)(1),
(2) Date: Nov. 9, 2017

(87) PCT Pub. No.: WO2016/182077
PCT Pub. Date: Nov. 17, 2016

(65) Prior Publication Data
US 2018/0142057 A1    May 24, 2018

(30) Foreign Application Priority Data

May 13, 2015  (JP) .................................. 2015-098607

(51) Int. Cl.
*C08G 59/24*      (2006.01)
*C08J 5/24*       (2006.01)
(Continued)

(52) U.S. Cl.
CPC ................ *C08G 59/24* (2013.01); *C08J 5/04* (2013.01); *C08J 5/24* (2013.01); *C08K 5/21* (2013.01);
(Continued)

(58) Field of Classification Search
CPC ............... C08L 63/00–10; C08L 51/00; C09D 163/00–10; C09D 151/00;
(Continued)

(56) References Cited

U.S. PATENT DOCUMENTS

| | | | | |
|---|---|---|---|---|
| 5,439,746 A | * | 8/1995 | Suzuki .................... | C08L 63/00 428/413 |
| 2011/0294954 A1 | | 12/2011 | Fukutani et al. | |
| 2015/0030791 A1 | * | 1/2015 | Tsuchiya ................ | C08G 59/50 428/36.1 |

FOREIGN PATENT DOCUMENTS

| | | |
|---|---|---|
| EP | 0 463 866 A2 | 1/1992 |
| EP | 1 884 531 A1 | 2/2008 |

(Continued)

OTHER PUBLICATIONS

Robert F. Fedors, "A Method for Estimating Both the Solubility Parameters and Molar Volumes of Liquids," Polym. Eng. & Sci. 14(2), 147-154 (1974).*

(Continued)

*Primary Examiner* — Kregg T Brooks
(74) *Attorney, Agent, or Firm* — Oblon, McClelland, Maier & Neustadt, L.L.P.

(57) ABSTRACT

A sheet-molding compound comprising a thickened thermosetting resin composition and reinforcing fiber bundles. The thermosetting resin composition comprises components (A), (B) and (D). The content of component (D) is 10 parts by mass to 30 parts by mass with respect to 100 parts by mass of the total amount of epoxy resin. The final viscosity of the (Continued)

thickened thermosetting resin composition is 150 Pa·s to 20000 Pa·s, and the minimum viscosity is 2 Pa·s to 600 Pa·s, the final viscosity being higher than the minimum viscosity.

17 Claims, 1 Drawing Sheet

(51) Int. Cl.
    *C08J 5/04*         (2006.01)
    *C08L 63/00*       (2006.01)
    *C08L 51/00*       (2006.01)
    *C08K 5/21*         (2006.01)
    *C08K 5/315*       (2006.01)
    *C08K 7/06*         (2006.01)

(52) U.S. Cl.
    CPC ............... *C08K 5/315* (2013.01); *C08K 7/06* (2013.01); *C08L 51/00* (2013.01); *C08L 63/00* (2013.01)

(58) Field of Classification Search
    CPC .............. C09J 163/00–10; C09J 151/00; C08J 2363/00–10; C08J 2351/00; C08J 5/24; C08J 5/04; C08G 59/24; C08G 59/245; C08K 7/06
    See application file for complete search history.

(56) References Cited

FOREIGN PATENT DOCUMENTS

| | | |
|---|---|---|
| JP | 10-44250 A | 2/1998 |
| JP | 10-330513 | 12/1998 |
| JP | 11-181245 A | 7/1999 |
| JP | 11-199755 A | 7/1999 |
| JP | 2005-247879 A | 9/2005 |
| JP | 2005-330482 | 12/2005 |
| JP | 2013-103433 A | 5/2013 |
| JP | 2013-104016 A | 5/2013 |
| JP | 2015-032647 A | 2/2015 |
| JP | 2016-528361 A | 9/2016 |
| WO | 98/22527 A1 | 5/1998 |
| WO | 2010/090246 A1 | 8/2010 |
| WO | WO 2015/023615 A1 | 2/2015 |
| WO | WO 2016/060166 A1 | 4/2016 |

OTHER PUBLICATIONS

Hexion Technical Data Sheet, Epon 828 (Sep. 2005).*
DIC Corporation, Epiclon Standard Products Epoxy Resins and Curing Agents (Mar. 2013).*
Hexion Technical Data Sheet, Epon 862 (Mar. 2005).*
International Search Report dated Jul. 12, 2016 in PCT/JP2016/064367, filed on May 13, 2016.
Extended European Search Report dated Jun. 6, 2018 in European Patent Application No. 16792801.9, 7 pages.
Japanese Office Action dated Dec. 4, 2018 in Japanese Patent Application No. 2017-215072 (with unedited computer generated English translation), 9 pages.
Office Action in corresponding Japanese Application No. 2017-215072, dated May 14, 2019. (w/Machine Translation).

* cited by examiner

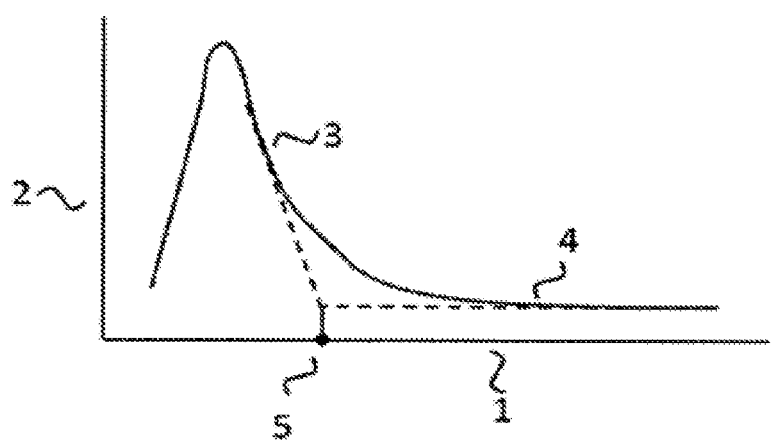

SHEET-MOLDING COMPOUND AND FIBER-REINFORCED COMPOSITE MATERIAL

TECHNICAL FIELD

The present invention relates to a sheet-molding compound, a fiber-reinforced composite material, a molding material, and a bulk molding compound.

BACKGROUND ART

In regard to plastic members that require characteristics of being lightweight and having high strength, and have complex shapes, so-called FRP (Fiber Reinforced Plastics; also referred to as fiber-reinforced composite materials) are conventionally used for the forming of component parts of fishing ships, sports goods, bathtubs, automobiles, and the like.

In recent years, among these FRP materials, sheet-like or bulk-like materials that use short fibers as reinforcing materials, namely, so-called SMCs (sheet-molding compounds) and BMCs (bulk molding compounds), have been increasingly utilized from the viewpoints of workability, working environment, and the like. Regarding the curable resins that constitute SMCs and BMCs, unsaturated polyesters and materials obtained by diluting oligomers such as vinyl esters with styrene are generally used, and if necessary, a curing agent and a thickening agent are selected and incorporated thereinto. Furthermore, according to the use applications, a colorant, a low constrictive agent, a mold releasing agent, a filler, and the like can also be added to the curable resin.

Patent Literatures 1 to 4 describe SMCs and BMCs that use epoxy resins.

Meanwhile, fiber-reinforced composite materials (FRP) formed from reinforcing fibers and matrix resins have been widely used for aircraft, automobile, and industrial applications, due to their excellent mechanical properties and the like. In recent years, as the usage results accumulate, the range of applications of fiber-reinforced composite materials is becoming even broader. The matrix resin that constitutes such a composite material is required to have excellent moldability and to exhibit superior mechanical strength even in a high-temperature environment. Regarding the matrix resin, thermosetting resins having excellent impregnating properties or heat resistance are used in many occasions, and a phenolic resin, a melamine resin, a bismaleimide resin, an unsaturated polyester resin, an epoxy resin, or the like is used as such a thermosetting resin. Among these, an epoxy resin has excellent thermal resistance and moldability, and when an epoxy resin is used, a fiber-reinforced composite material having superior mechanical strength is obtained. Therefore, epoxy resins are widely used.

A fiber-reinforced composite material is produced by autoclave molding filament winding molding, resin infusion molding, vacuum resin infusion molding, press molding or the like, using an intermediate material containing reinforcing fibers and a matrix resin composition. Above all, press molding is accompanied by high productivity, and a molded product having excellent design surfaces may be easily obtained. Therefore, the demand for press molding has been increasing in recent years.

Particularly, since a molded product having a complex shape can be easily produced by pres molding a SMC (sheet-molding compound), utilization of fiber-reinforced composite materials in, for example, structural members for automobiles is becoming popular.

Regarding curable resins that constitute SMCs, unsaturated polyesters and materials obtained by diluting oligomers such as vinyl esters with styrene are generally used; however, since these undergo significant cure shrinkage, development of a SMC that uses an epoxy resin as a base resin is desired.

Here, regarding epoxy resin compositions that are used for adhesives, for example, the following have been suggested.

A resin composition including (A) an epoxy resin; (B) an amine-based curing agent; and (C) an accelerator having at least one functional group selected from a dimethylureido group, an imidazole group, and a tertiary amino group, the resin composition being liquid at normal temperature without substantially including a solvent (Patent Literature 5), a one-liquid heating-curable epoxy resin composition including an epoxy resin; a curing agent including dicyandiamide; a first curing accelerator including 3,4-dichlorophenyl-1,1-dimethylurea; and a second curing accelerator including an imidazole compound having a triazine ring (Patent Literature 6), and a one-component-based heating-curable epoxy resin composition including (A) an epoxy compound; (B) a curing agent composition obtainable by reacting an amine compound with an epoxy compound; and (C) a filler (Patent Literature 7).

CITATION LIST

Patent Literature

Patent Literature 1: JP 2007-270136 A (published on Oct. 18, 2007)

Patent Literature 2: JP 6-166742 A (published on Jun. 14, 1994)

Patent Literature 3: JP 11-181245 A (published on Jul. 6, 1999)

Patent Literature 4: JP 11-199755 A (published on Jul. 27, 1999)

Patent Literature 5: WO 2013/111697 A (published on Aug. 1, 2013)

Patent Literature 6: JP 2014-185256 A (published on Oct. 2, 2014)

Patent Literature 7: JP 2006-111800 A (published on Apr. 27, 2006)

SUMMARY OF THE INVENTION

Problem to be Solved by the Invention

Generally, resin compositions for producing SMCs have a plurality of problems to be solved. Some of them will be disclosed below.

A first problem is that the resin compositions undergo significant cure shrinkage. Cure shrinkage causes the occurrence of warp, surface sink, cracks, and the like of molded articles. There are occasions in which low constrictive agents are added in order to reduce cure shrinkage; however, the addition of a low constrictive agent may cause deterioration of heat resistance and a decrease in strength.

A second problem is the control of viscosity. SMCs include magnesium oxide, isocyanates, and the like as thickening agents. These thickening agents increase the viscosity of resins and suppress tack; however, since the viscosity of a resin largely fluctuates under the influence of the amount of addition of the thickening agent, moisture, and temperature, stable production of SMC is difficult.

A third problem is deterioration of physical properties caused by filler. SMCs generally have large amounts of calcium carbonate, carbon black, and the like added thereto as fillers. The reason why a large amount of a filler is added to a SMC is to impart thixotropy or to suppress cure shrinkage. However, when a large amount of a filler is added, the filler is filtered out by the reinforcing fibers at the time of impregnation of the resin composition, and the filler is likely to aggregate at the SMC surface. Since the adhesive force between a resin composition and a filler is small, such a site of aggregation serves as a starting point for destruction by stress concentration in the phenomenon of destruction, and the mechanical strength tends to decrease. Furthermore, since a filler is added in a large amount, the chemical resistance of a SMC molded article is largely dependent on the chemical resistance of the filler.

The matrix resin compositions for SMCs currently used have such problems, and it is desirable to solve these problems as soon as possible.

Some of these problems can be solved by, for example, the SMCs described in Patent Literatures 1 to 4, which include matrix resin compositions each containing an epoxy resin as a main component. Epoxy resins have excellent dimensional stability, and thus, the probability of the occurrence of warp, surface sink, and cracks of molded articles is markedly reduced. Furthermore, since most of the raw materials are compounds with low vapor pressures, a foul odor and the adverse influence on human bodies can be reduced to a large extent.

In Patent Literatures 1 and 2, techniques of causing epoxy groups to react by heating and thereby increasing the viscosity in order to subject the matrix resin composition to B-staging are employed; however, once the polymerization reaction of epoxy groups is accelerated, it is difficult to stop the reaction, and it is difficult to control the viscosity to an appropriate range. Therefore, in a technique of thickening a matrix resin composition by means of a polymerization reaction of epoxy groups, stable production of a SMC is difficult. It can be easily imagined that a matrix resin composition obtained by this technique, a SMC including this composition, and the like have shorter shelf lives. In addition, it is described in Patent Literature 1 that production of a SMC is difficult when the fiber basis weight is 1,300 g/m$^2$ or more, and handleability is deteriorated. Thus, it cannot be said that the matrix resin compositions are necessarily resin compositions appropriate for SMCs.

Patent Literatures 3 and 4 disclose resin compositions each including an epoxy resin, a curing agent, a thermoplastic resin powder thickening agent, and an inorganic filler as essential components, and SMCs using these resin compositions. In these documents, a technique of thickening a resin composition by swelling or dissolving a thermoplastic resin powder under heating is employed. However, since a large amount of an inorganic filler is added to the resin composition in order to obtain thixotropy, and there is a high possibility that the inorganic filler may aggregate on the surface of the SMC or inside the SMC. When the filler aggregates, there is a risk that the aggregation may lead to deterioration of mechanical characteristics. If the amount of the filler is suppressed to a low level, not only thixotropy may not be obtained, but also tackiness increases beyond a desired range.

Furthermore, the thermoplastic resin powders used in Patent Literatures 3 and 4 have a problem that the particle size is too small, or in a case in which the thermoplastic resin powder is a core-shell type copolymer, the glass transition temperature of the core is too low. Thus, it cannot be said that improvements in the shelf lives of the resin compositions and SMCs are sufficient. Furthermore, the content of the thermoplastic resin powder in the resin composition is so large that there is a problem that the mechanical strength of a molded article thus obtainable is insufficient.

The invention is an invention achieved in view of such circumstances, and it is an object to provide a SMC having satisfactory tackiness and also having excellent moldability.

Since press molding is generally carried out at high temperature for a short time, a resin composition that is used for this process is required to be curable in a short time period, and a cured product of the resin composition is required to have high heat resistance. Furthermore, since fluidity in a mold is needed at the time of press molding, the resin composition is required to have storage stability (that is, having low thickening properties over time).

However, in regard to an epoxy resin composition, it is difficult to achieve a balance between rapid curability and storage stability. That is, since a curing agent that cures an epoxy resin in a short time period reacts rapidly with an epoxy resin at room temperature, an epoxy resin composition including this curing agent has superior thickening properties over time. That is, the resin composition has low storage stability. On the other hand, a curing agent having low reactivity with an epoxy resin at room temperature, an epoxy resin composition including this curing agent has low thickening properties over time, and an epoxy resin composition having excellent storage stability is obtained. However, it is difficult to cure the epoxy resin composition in a short time period at the time of molding.

The epoxy resin compositions disclosed in Patent Literatures 5 to 7 are not all capable of achieving a balance between rapid curability and storage stability to a sufficient extent.

It is another object of the invention to provide a molding material, a sheet-molding compound, and a bulk molding compound, all of which can be cured in a short time period and have excellent storage stability at normal temperature, and to provide a fiber-reinforced composite material having high heat resistance, which is produced using the molding material, the sheet-molding compound, or the bulk molding compound.

Means for Solving Problem

The inventors of the invention have conducted a thorough investigation, and as a result, the inventors found that when a thermosetting resin composition containing an epoxy resin as a main component and containing particles of a particular vinyl polymer is used, a SMC having satisfactory tackiness and having excellent moldability can be easily provided, thus completing the invention.

That is, a sheet-molding compound according to a first aspect of the invention (first invention) is a sheet-molding compound comprising a thickened product of a thermosetting resin composition and reinforcing fiber bundles, in which the thermosetting resin composition contains Component (A): a liquid epoxy resin having a viscosity at 25° C. of 1 Pa·s or higher, Component (B): an epoxy resin curing agent, and Component (D): vinyl polymer particles, the content of the Component (D) is from 10 parts by mass to 30 parts by mass with respect to 100 parts by mass of the total amount of epoxy resins included in the thermosetting resin composition, the attained viscosity of the thickened product of the thermosetting resin composition is from 150

Pa·s to 20,000 Pa·s while the minimum viscosity is from 2 Pa·s to 600 Pa·s, and the attained viscosity is higher than the minimum viscosity.

Furthermore, the sheet-molding compound according to the first aspect of the invention is a sheet-molding compound comprising a thickened product of a thermosetting resin composition and reinforcing fiber bundles, in which the thermosetting resin composition includes Component (A): a liquid epoxy resin having a viscosity at 25° C. of 1 Pa·s or higher, Component (B): an epoxy resin curing agent, and Component (D): vinyl polymer particles, the content of the Component (D) is from 10 parts by mass to 30 parts by mass with respect to 100 parts by mass of the total amount of epoxy resins included in the composition, and the Component (D) is such that a dispersion obtainable by dispersing the Component (D) in a bisphenol A type epoxy resin having an epoxy equivalent of 190±6 g/eq has a thickening ratio, $d_1/d_0$ (provided that $d_0$ represents the viscosity obtainable immediately after preparation of the dispersion obtained by dispersing 30 parts by mass of Component (D) in 100 parts by mass of the bisphenol A type epoxy resin at 30° C.; and $d_1$ represents the viscosity obtainable after heating the dispersion to 60° C. and maintaining the dispersion at 60° C. for one hour after the heating), of 1.0 or less.

Effect of the Invention

According to the first aspect of the invention, there is provided an effect that a SMC having satisfactory storage stability and tackiness as well as excellent moldability can be provided.

Also, according to a second aspect of the invention (second invention), an intermediate material for a molding material, a sheet-molding compound, a bulk molding compound, and the like, the intermediate material being curable in a short time period and having excellent storage stability at normal temperature, is obtained. Furthermore, by using such an intermediate material, a fiber-reinforced composite material having high heat resistance can be obtained. Therefore, such an intermediate material is adequate for press molding, and particularly for high-cycle press molding.

BRIEF DESCRIPTION OF DRAWINGS

FIG. 1 is a diagram illustrating a DSC exothermic curve of an epoxy resin composition according to an embodiment of the invention.

MODE(S) FOR CARRYING OUT THE INVENTION

<First Invention>

The sheet-molding compound according to the first invention is a sheet-molding compound comprising a thickened product of a thermosetting resin composition and reinforcing fiber bundles, in which the thermosetting resin composition includes Component (A): a liquid epoxy resin having a viscosity at 25° C. of 1 Pa·s or higher, Component (B): an epoxy resin curing agent, and Component (D): vinyl polymer particles, the content of the Component (D) is from 10 parts by mass to 30 parts by mass with respect to 100 parts by mass of the total amount of epoxy resins included in the thermosetting resin composition, the attained viscosity of the thickened product of the thermosetting resin composition is from 150 Pa·s to 20,000 Pa·s while the minimum viscosity is from 2 Pa·s to 600 Pa·s, and the attained viscosity is higher than the minimum viscosity.

Furthermore, the term "epoxy resin" is used as a generic name for one category of thermosetting resins, or as a generic name for a category of chemical substances called compounds having epoxy groups in the molecule. In the first invention, the term "epoxy resin" is used to mean the latter.

<Sheet-Molding Compound>

The sheet-molding compound (SMC) according to the first invention contains a thickened product of a thermosetting resin composition and reinforcing fiber bundles, in which the attained viscosity of the thickened product of the thermosetting resin composition (hereinafter, may be referred to as "resin thickened product") is from 150 Pa·s to 20,000 Pa·s while the minimum viscosity is from 2 Pa·s to 600 Pa·s, and the attained viscosity is higher than the minimum viscosity.

Here, the attained viscosity of the resin thickened product corresponds to the viscosity at 30° C. of the resin thickened product included in the SMC.

The SMC of the first invention is obtained by, as will be described below, impregnating reinforcing fiber bundles with a thermosetting resin composition, and thickening the thermosetting resin composition. Thickening of the thermosetting resin composition occurs as a result of the function of Component (D) that will be described below. More specifically, a thermosetting resin composition including Component (D) is heated to a temperature higher than or equal to the temperature at which this Component (D) dissolves in an epoxy resin or this Component (D) is swollen by an epoxy resin, and thereby the viscosity of the thermosetting resin composition is increased. The viscosity of the resin composition initially rises rapidly and increases to a certain value, and then becomes almost constant. The resin thickened product included in a SMC that is marketed as a manufactured product corresponds to a state in which this viscosity has become almost constant.

The attained viscosity of the resin thickened product is measured as follows using a rheometer.

First, the plate temperature of a rheometer is set to be from 80° C. to 90° C. After it is confirmed that the temperature has been stabilized, an appropriate amount of a thermosetting resin composition before thickening is dispensed on the plate. The gap between plates is adjusted to 0.5 mm, the thermosetting resin composition is maintained for 30 minutes at a temperature of from 80° C. to 90° C., and then the composition is cooled to 30° C. After cooling, the viscosity at 30° C. is measured, and this is designated as the attained viscosity. The conditions at the time of measurement are as follows.

Measurement mode: constant stress, stress value 300 Pa
Frequency: 1.59 Hz
Plate diameter: 25 mm
Plate type: parallel plates
Plate gap: 0.5 mm The lower limit of the attained viscosity of the resin thickened product included in the SMC according to the first invention may be 150 Pa·s or higher, and the lower limit is preferably 350 Pa·s or higher, and more preferably 1,000 Pa·s or higher. The upper limit of the attained viscosity may be 20,000 Pa·s or lower, and the upper limit is preferably 15,000 Pa·s or lower, and more preferably 10,000 Pa·s or lower. When the attained viscosity is 150 Pa·s or higher, a SMC that has sufficient shape retainability and can be easily handled at the time of cutting and disposing in a forming mold is obtained. When the attained viscosity is 20,000 Pa·s or lower, satisfactory fluidity inside the mold at the time of press molding is obtained. Therefore, when the lower limit of the attained viscosity is 150 Pa·s or higher, and the upper limit is 20,000 Pa·s or lower, the resin thickened product has excellent moldability.

The lower limit of the minimum viscosity of the resin thickened product included in the SMC according to the first invention may be 2 Pa·s or higher, and the lower limit is preferably 5 Pa·s or lower, and the lower limit is preferably 5 Pa·s or higher, and more preferably 10 Pa·s or higher. The upper limit of the minimum viscosity may be 600 Pa·s or lower, and the upper limit is preferably 500 Pa·s or lower, and more preferably 300 Pa·s or lower. When the lower limit of the minimum viscosity of the resin thickened product is 2 Pa·s or higher, there is an effect that flow of the resin is suppressed at the time of press molding, and when the lower limit of the minimum viscosity is 600 Pa·s or lower, on the occasion of molding a manufactured product having a complex shape, the resin composition flows even into fine parts of the forming mold, and therefore, satisfactory shapability is obtained. The minimum viscosity of a resin thickened product corresponds to the lowest viscosity of the resin thickened product in a SMC when the SMC is hot press molded. The attained viscosity may have any value as long as it is higher than the minimum viscosity; however, if the attained viscosity is higher by 150 Pa·s or higher than the minimum viscosity, it is preferable because excellent moldability is obtained during press molding.

The minimum viscosity of the resin thickened product is the lowest viscosity that is obtained when the viscosity is measured while the temperature is raised at a rate of 2° C./min using a rheometer. Furthermore, the measurement mode, frequency, plate diameter, plate type, and plate gap employed at the time of measuring the minimum viscosity are the same as those at the time of measuring the attained viscosity as described above.

In order to obtain a resin thickened product having viscosity characteristics described above, the thermosetting resin composition before thickening that is included in the sheet-molding compound according to the first invention includes Component (A): a liquid epoxy resin having a viscosity at 25° C. of 1 Pa·s or higher, Component (B): an epoxy resin curing agent, and Component (D): vinyl polymer particles, and the content of the Component (D) is from 10 parts by mass to 30 parts by mass with respect to 100 parts by mass of the total amount of epoxy resins included in the thermosetting resin composition.

Furthermore, in regard to the Component (D), as will be described below, it is preferable that a dispersion obtainable by dispersing the Component (D) in a bisphenol A type epoxy resin having an epoxy equivalent of 190±6 g/eq has a thickening ratio, $d_1/d_0$ (provided that $d_0$ represents the viscosity obtainable immediately after the preparation of a dispersion obtained by dispersing 30 parts by mass of Component (D) in 100 parts by mass of the bisphenol A type epoxy resin at 30° C.; and $d_1$ represents the viscosity obtainable after heating the dispersion to 60° C. and maintaining the dispersion at 60° C. for one hour after heating), of 1.0 or less.

In other words, a sheet-molding compound comprising a thickened product of a thermosetting resin composition and reinforcing fiber bundles, in which the thermosetting resin composition includes Component (A): a liquid epoxy resin having a viscosity at 25° C. of 1 Pa·s or higher, Component (B): an epoxy resin curing agent, and Component (D): vinyl polymer particles, the content of the Component (D) is from 10 parts by mass to 30 parts by mass with respect to 100 parts by mass of the total amount of epoxy resins included in the thermosetting resin composition, and the Component (D) is such that a dispersion obtainable by dispersing the Component (D) in a bisphenol A type epoxy resin having an epoxy equivalent of 190±6 g/eq has a thickening ratio, $d_1/d_0$ (provided that $d_0$ represents the viscosity obtainable immediately after the preparation of a dispersion obtained by dispersing 30 parts by mass of Component (D) in 100 parts by mass of the bisphenol A type epoxy resin at 30° C.; and $d_1$ represents the viscosity obtainable by heating the dispersion to 60° C. and maintaining the dispersion at 60° C. for one hour after the heating), of 1.0 or less, is preferable because the attained temperature and the minimum temperature of the resin thickened product included in this sheet-molding compound are in the above-mentioned ranges.

The thermosetting resin composition used in the first invention has a viscosity appropriate for the impregnation into reinforcing fiber bundles as will be described below, and therefore, the thermosetting resin composition is suitable as a matrix resin composition for SMCs. Furthermore, since the thermosetting resin composition is thickened at a relatively low temperature, the reaction of the epoxy resin in the composition during the thickening step is not accelerated, and a SMC Having satisfactory storage stability can be obtained. Also, since the thermosetting resin composition according to the first invention is appropriately thickened near the heating temperature at the time of molding a SMC, a SMC having satisfactory tackiness is obtained.

<Component (A)>

The thermosetting resin composition used in the first invention includes Component (A): a liquid epoxy resin having a viscosity at 25° C. of 1 Pa·s or higher. When the resin composition includes such an epoxy resin, the temperature at which dissolution of the Component (D): vinyl polymer particles that will be described below in the thermosetting resin composition occurs, or the temperature at which swelling of Component (D) in the thermosetting resin composition occurs, is prevented from being too low. As a result, in a case in which the thermosetting resin composition used in the first invention is used for the production of a SMC, in a process of impregnating reinforcing fiber bundles with the thermosetting resin composition, since Component (D) maintains a particulate shape, the thermosetting resin composition has superior impregnating properties, and the tackiness of the SMC thus obtainable can be controlled to an appropriate range.

Component (A) may be any liquid epoxy resin having a viscosity at 25° C. of 1 Pa·s or higher; however, an epoxy resin having an aromatic ring in the molecule is preferable. It is because the mechanical characteristics of the cured product can be regulated to desired ranges. Furthermore, it is more preferable that Component (A) is a bifunctional epoxy resin. It is because desired heat resistance and toughness are obtained. The "bifunctional epoxy resin" as used herein means a compound having two epoxy groups in the molecule. Hereinafter, the same also applies to "trifunctional epoxy resin" or the like.

Examples of a liquid bifunctional epoxy resin that has an aromatic ring and has a viscosity at 25° C. of 1 Pa·s or higher include jER825, jER827, jER828, jER828EL, jER828XA, jER806, jER806H, jER807, jER4004P, jER4005P, jER4007P, and jER4010P (all manufactured by Mitsubishi Chemical Corp.); EPICLON 840, EPICLON 840-S, EPICLON 850, EPICLON 850-S, EPICLON EXA-850CRP, EPICLON 850-LC, EPICLON 830, EPICLON 830-S, EPICLON 835, EPICLON EXA-830CRP, EPICLON EXA-830LVP, and EPICLON EXA-835LV (all manufactured by DIC Corp.); and EPOTOHTO YD-115, EPOTOHTO YD-115G, EPOTOHTO YD-115CA, EPOTOHTO YD-118T, EPOTOHTO YD-127, EPOTOHTO YD-128, EPOTOHTO YD-128G, EPOTOHTO YD-128S, EPOTOHTO YD-128CA, EPOTOHTO YDF-170, EPOTOHTO YDF-2001, EPOTOHTO YDF-2004, and EPOTOHTO YDF-2005RL (all manufactured by Nippon Steel & Sumikin Chemical Co., Ltd.). Furthermore, two or more kinds of epoxy resins may be used in combination.

The thermosetting resin used in the first invention may include an epoxy resin other than Component (A). The epoxy resin other than Component (A) may be a resin that is in a semisolid or solid state at 25° C., and among others, an epoxy resin having an aromatic ring is preferred, while a bifunctional epoxy resin is more preferred.

Examples of a bifunctional epoxy resin that has an aromatic ring and is in a semisolid or solid state at 25° C. include jER834, jER1001, jER1002, jER1003, jER1055, jER1004, jER1004AF, jER1007, jER1009, jER1010, jER1003F, jER1004F, jER1005F, jER1009F, jER1004FS, jER1006FS, jER1007FS, 4004P, 4005P, 4007P, and 4010P (all manufactured by Mitsubishi Chemical Corp.); EPICLON 860, EPICLON 1050, EPICLON 1055, EPICLON 2050, EPICLON 3050, EPICLON 4050, EPICLON 7050, EPICLON HM-091, and EPICLON HM-101 (all manufactured by DIC Corp.); and EPOTOHTO YD-134, EPOTOHTO YD-011, EPOTOHTO YD-012, EPOTOHTO YD-013, EPOTOHTO YD-014, EPOTOHTO YD-017, EPOTOHTO YD-019, EPOTOHTO YD-020 G, EPOTOHTO YD-7011 R, EPOTOHTO YD-901, EPOTOHTO YD-902, EPOTOHTO YD-903 N, EPOTOHTO YD-904, EPOTOHTO YD-907, and EPOTOHTO YD-6020 (all manufactured by Nippon Steel & Sumikin Chemical Co., Ltd.). Furthermore, two or more kinds of epoxy resins may also be used in combination.

Among these epoxy resins, in a case in which a bisphenol type epoxy resin that is liquid at 25° C. is preferable from the viewpoint that in a case in which the epoxy resin is used as a matrix resin composition for a SMC as will be described below, it is easy to adjust the viscosity of the resin composition to a viscosity appropriate for the impregnation into reinforcing fiber bundles, and the mechanical characteristics of a molded product obtainable by curing a SMC or the like can be easily regulated to desired ranges.

Among them, a bisphenol A type epoxy resin and a bisphenol F type epoxy resin are particularly preferred. Furthermore, the bisphenol A type epoxy resin is preferable from the viewpoint that a thermosetting resin composition including this epoxy resin has satisfactory curability, and a cured product of the relevant thermosetting resin composition has satisfactory heat resistance and chemical resistance. The bisphenol F type epoxy resin is preferable because the epoxy resin has a lower viscosity than a bisphenol A type epoxy resin having a molecular weight of the same extent, and a cured product of a thermosetting resin composition including this epoxy resin has a high elastic modulus.

In addition to a bifunctional epoxy resin as the epoxy resin other than Component (A), various epoxy resins can be incorporated into the thermosetting resin composition used in the first invention for the purpose of enhancing heat resistance and adjusting viscosity. In order to enhance heat resistance, a polyfunctional type epoxy resin having a novolac type naphthalene skeleton is effective. Examples include jER152, 154, 157S70, 1031S, 1032H60, 604, 630, 630LSD, YX4000, YX4000H, YL6121H, and YX7399 (all manufactured by Mitsubishi Chemical Corp.); YDPN-638, YDCN-700-3, YDCN-700-5, YDCN-700-7, YDCN-700-10, YDCN-704, and YDCN-704A (all manufactured by Nippon Steel & Sumikin Chemical Co., Ltd.); and N-660, N-665, N-670, N-673, N-680, N-690, N-695, N-665-EXP, N-672-EXP, N-655-EXP-S, N-662EXP-2, N-665-EXP-S, N-670-EXP-S, N-685-EXP-S, N-673-80M, N-680-75M, and N-690-75M (all manufactured by DIC Corp.).

In order to adjust the viscosity of the thermosetting resin composition, a so-called reactive diluent can be mixed into the thermosetting resin composition to the extent that the effects of the first invention are not impaired. The "reactive diluent" according to the present specification refers to an epoxy resin having a viscosity at 25° C. of lower than 1 Pa·s. Examples of the reactive diluent include jER819 (manufactured by Mitsubishi Chemical Corp.), diglycidylaniline (GAN, manufactured by Nippon Kayaku Co., Ltd.), diglycidyltoluidine (GOT, manufactured by Nippon Kayaku Co., Ltd.); ED-502, ED-509E, ED-509S, ED-529, ED-503, ED-503 G, ED-506, ED-523T, and ED-505 (all manufactured by Adeka Corp.); EX-512, EX-411, EX-421, EX-313, EX-314, EX-321, EX-201, EX-211, EX-212, EX-810, EX-811, EX-850, EX-851, EX-821, EX-830, EX-911, EX-941, EX-920, EX-141, EX-145, and EX-146 (all manufactured by Nagase ChemteX Corp.).

It is preferable that the content of Component (A) in the thermosetting resin composition used in the first invention is determined such that the viscosity at 30° C. of the thermosetting resin composition reaches from 1 Pa·s to 50 Pa·s. This content may vary depending on the kind of Component (A); however, the lower limit is usually 20 parts by mass or more, and preferably 60 parts by mass or more, in 100 parts by mass of the total amount of epoxy resins included in the thermosetting resin composition. Furthermore, the upper limit is usually 100 parts by mass or less, and preferably 100 parts by mass or less. By adjusting the content to the range described above, the viscosity of the thermosetting resin composition can be easily adjusted to the viscosity range described above. When such a thermosetting resin composition is used for the production of a SMC, superior impregnating properties may be obtained. Furthermore, when the viscosity is in the range described above, it is preferable because a fiber-reinforced composite material having high toughness and high heat resistance is obtained by molding the SMC.

<Component (B)>

The thermosetting resin composition used in the first invention includes Component (B): an epoxy resin curing agent.

The type of Component (B): epoxy resin curing agent is not limited as long as the curing agent is capable of curing an epoxy resin; however, examples include an amine, an acid anhydride (a carboxylic acid anhydride or the like), a phenol (a novolac resin or the like), mercaptan, a Lewis acid, an amine complex, an onium salt, and an imidazole. Regarding the form of the curing agent, various forms such as a microcapsule form and an adduct form can be employed.

Among the examples of Component (B) listed above, an amine type curing agent is preferred. Examples of the amine type curing agent include an aromatic amine such as diaminodiphenylmethane and diaminodiphenylsulfone; an aliphatic amine, an imidazole derivative, dicyandiamide, tetramethylguanidine, a thiourea-added amine, and isomers and modification products thereof. Among these, dicyandiamide is particularly preferable because a thermosetting resin composition including this has satisfactory storage stability. Regarding Component (B), one kind of compound may be used alone, or two or more kinds of compounds may be used in combination.

Regarding the content of Component (B), it is more preferable to add the Component (B) in an amount of from 5 parts by mass to 20 parts by mass with respect to 100 parts by mass of the total amount of epoxy resins included in the thermosetting resin composition used in the first invention. When the content is 5 parts by mass or more, curability is further enhanced, and when the content is 20 parts by mass or less, the amount of unreacted curing agent is further reduced, while satisfactory mechanical characteristics are obtained.

<Component (C)>

It is more preferable that the thermosetting resin composition used in the first invention includes Component (C): an epoxy resin curing accelerator.

Regarding the SMC, one that has storage stability and can be cured in a short time period is preferred. In the case of using a curing agent having high storage stability, curing is achieved more easily in a short time period, and therefore, it is preferable to add a curing accelerator.

The curing accelerator is not limited as long as the curing agent can be activated; however, for example, urea derivatives such as 3-phenyl-1,1-dimethylurea, 3-(3,4-dichlorophenyl)-1,1-dimethylurea (DCMU), 3-(3-chloro-4-methylphenyl)-1,1-dimethylurea, 2,4-bis(3,3-dimethylurea)toluene, and 1,1'-(4-methyl-1,3-phenylene)bis(3,3-dimethylurea) are preferred. The compounds listed here as examples are particularly preferable in the case of employing dicyandiamide in particular as Component (B). Above all, when dicyandiamide is used as Component (B) and 2,4-bis(3,3-dimethylurea)toluene is used as Component (C), the curing time can be significantly shortened.

Regarding the content of Component (C), it is more preferable that Component (C) is added in an amount in the range of from 3 parts by mass to 10 parts by mass with respect to 100 parts by mass of the total amount of epoxy resins included in the thermosetting resin composition used in the first invention. This range is even more preferable in a case in which 2,4-bis(3,3-dimethylureido)toluene is used as the Component (C). When the content is 3 parts by mass or more, rapid curability is efficiently promoted, and when the content is 10 parts by mass or less, the thermosetting resin composition is cured without impairing heat resistance.

<Component (D)>

The thermosetting resin composition used in the first invention includes Component (D): vinyl polymer particles.

Component (D) is preferably such that a dispersion obtainable by dispersing Component (D) in a bisphenol A type epoxy resin having an epoxy equivalent of 190±6 g/eq has a thickening ratio, $d_1/d_0$, of 1.0 or less (provided that $d_0$ represents the viscosity obtainable immediately after the preparation of a dispersion obtainable by dispersing 30 parts by mass of Component (D) in 100 parts by mass of the bisphenol A type epoxy resin; and $d_1$ represents the viscosity obtainable after heating the dispersion to 60° C. and maintaining the dispersion at 60° C. for one hour after the heating).

Since Component (D) exists as particles dispersed in the matrix resin composition at a temperature of from normal temperature (that is, about 10° C. to 30° C.) to 60° C., the viscosity of a thermosetting resin composition including this component increases only very little over time. However, for example, at a high temperature of from 80° C. to 90° C., as Component (D) dissolves in Component (A), or Component (D) is swollen by Component (A), the viscosity of the thermosetting resin composition including this component increases significantly. The thermosetting resin composition used in the first invention achieves a balance between having a viscosity appropriate for the impregnation into reinforcing fiber bundles, and obtaining satisfactory tackiness and handleability when the resin composition is molded into a SMC or the like, by incorporating the Component (D) having such properties into a thermosetting resin.

Conventionally, the matrix resin composition having a viscosity appropriate for the impregnation into reinforcing fiber bundles, and a SMC obtainable by using the matrix resin composition having satisfactory tackiness are in a trade-off relation. It is because, in order to efficiently impregnate reinforcing fiber bundles with the matrix resin composition, it is required that the matrix resin composition has low viscosity; however, when a SMC is produced using a low-viscosity resin composition, satisfactory tackiness cannot be obtained. However, the thermosetting resin composition used in the first invention achieves a balance between these two points. That is, the thermosetting resin composition has low viscosity before Component (D) dissolves or swells, and it is easy to impregnate reinforcing fiber bundles with the thermosetting resin composition. The viscosity of the thermosetting resin composition can be increased in a short time period by dissolving the Component (D) in the Component (A) by heating, or by swelling the Component (D) by means of the Component (A). A SMC containing such a thermosetting resin composition has suppressed surface tackiness and also has satisfactory handleability.

Therefore, the thermosetting resin composition described above is appropriate for matrix resin compositions of a thick prepreg, a SMC, a BMC, and the like.

Particularly, it is required that at the time of impregnation of the reinforcing fiber bundles, the matrix resin composition used for a SMC has a viscosity that is lower to a large extent than the viscosity of a matrix resin composition that is usually used for a prepreg, and from the viewpoint of the surface tackiness of the SMC thus obtained, it is required that the matrix resin composition has high viscosity. Therefore, it is very difficult to satisfy both conditions. However, the balance can be achieved by using the thermosetting resin composition used in the first invention.

Furthermore, in the case of a SMC, when the viscosity of the matrix resin composition included in the SMC becomes higher, fibers flow along with the flow of the matrix resin composition at the time of press molding, and therefore, a fiber-reinforced composite material having a uniform concentration of reinforcing fibers can be obtained.

It is preferable that the extent of viscosity increase (viscosity after viscosity increase) of the thermosetting resin composition caused by dissolution or swelling of Component (D) as described above is in a particular range.

That is, the viscosity after maintaining for one hour at or below 60° C. is preferably about 10 Pa·s or lower, and the viscosity after maintaining for one hour at or above 80° C. is preferably about 100 Pa·s or higher.

In order to realize such viscosity characteristics, the thickening ratio of Component (D) is preferably 1.0 or less, and it is necessary that the content of Component (D) is from 10 parts by mass to 30 parts by mass with respect to 100 parts by mass of all the epoxy resins included in the thermosetting resin composition.

When the content of Component (D) is adjusted to be 10 parts by mass or more, the viscosity of the thermosetting resin composition increases significantly in a short time period as a result of swelling or dissolving of Component (D). Therefore, the surface tackiness can be controlled to an appropriate value by using the thermosetting resin composition as the matrix resin composition of a SMC.

Furthermore, when the content of Component (D) is adjusted to be 30 parts by mass or less, it is preferable because sufficient curability of a thermosetting resin composition including this component, and satisfactory mechanical characteristics of a molded product such as a fiber-reinforced composite material obtainable after curing, may be obtained.

The term "thickening ratio" according to the present specification means $d_1/d_0$ ($d_0$ and $d_1$ are as described above), and the thickening ratio of Component (D) is preferably 1.0 or less.

When vinyl polymer particles having a $d_1/d_0$ value of 1.0 or less are used as Component (D), at the time of preparing a thermosetting resin composition including this component, thickening of the composition caused by shear heat generation during stirring does not easily occur, and in a case in which a SMC is produced using the thermosetting resin composition thus obtained, the reinforcing fiber bundle-impregnating properties become satisfactory, which is preferable. If a SMC with defective impregnation is molded, there are occasions in which unimpregnated sites in a molded product thus obtainable (fiber-reinforced composite material) may swell up, and the mechanical strength may be lowered extremely. Thus, it is difficult to obtain a satisfactory molded product.

Furthermore, in regard to Component (D), it is more preferable that a dispersion obtainable by dispersing Component (D) in a bisphenol F type epoxy resin having an epoxy equivalent of 168±8 g/eq has a thickening ratio, $d_1'/d_0'$ (provided that $d_0'$ represents the viscosity obtainable immediately after the preparation of a dispersion obtainable by dispersing 30 parts by mass of the Component (D) in 100 parts by mass of the bisphenol F type epoxy resin at 30° C.; and $d_1'$ represents the viscosity obtainable by heating the dispersion to 60° C. and maintaining the dispersion at 60° C. for one hour after the heating), of 1.0 or less.

Furthermore, the volume average primary particle size of Component (D) is preferably 400 nm or more, more preferably 500 nm or more, particularly preferably 600 nm or more, and the volume average primary particle size is preferably 2,000 nm or less, more preferably 1,000 nm or less, and particularly preferably 900 nm or less. When the volume average primary particle size is adjusted to be 400 nm or more, the particles themselves have increased thermal stability, and when the volume average primary particle size is adjusted to be 2,000 nm or less, at the time of impregnating reinforcing fiber bundles with a thermosetting resin composition including this component, the thermosetting resin composition can penetrate into the interior of the reinforcing fiber bundles without having the particles filtered out and unevenly distributed at the surface. Thus, a fiber-reinforced composite material having uniform and superior mechanical characteristics and physical characteristics can be obtained.

Meanwhile, the volume average primary particle size can be measured using, for example, a conventionally known analyzer such as a laser diffraction scattering type particle size distribution analyzer.

Component (D) is vinyl polymer particles, and the component can be obtained by polymerizing a vinyl monomer capable of radical polymerization.

Examples of the vinyl monomer capable of radical polymerization, which becomes a raw material of Component (D), include (meth)acrylates such as methyl (meth)acrylate, ethyl (meth)acrylate, n-propyl (meth)acrylate, i-propyl (meth)acrylate, n-butyl (meth)acrylate, t-butyl (meth)acrylate, i-butyl (meth)acrylate, n-hexyl (meth)acrylate, n-octyl (meth)acrylate, 2-ethylhexyl (meth)acrylate, cyclohexyl (meth)acrylate, benzyl (meth)acrylate, phenyl (meth)acrylate, nonyl (meth)acrylate, decyl (meth)acrylate, dodecyl (meth)acrylate, stearyl (meth)acrylate, t-butylcyclohexyl (meth)acrylate, isobornyl (meth)acrylate, tricyclo[5.2.1.02.6]decan-8-yl methacrylate, and dicyclopentadienyl (meth)acrylate; aromatic vinyl monomers such as styrene, α-methylstyrene, and vinyltoluene; hydroxyl group-containing (meth)acrylates such as hydroxymethyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, and glycerol mono(meth)acrylate; other functional group-containing (meth)acrylates such as glycidyl (meth)acrylate, N,N-dimethylaminoethyl (meth)acrylate, and N-methyl-2,2,6,6-tetramethylpiperidyl (meth)acrylate; carboxyl group-containing vinyl monomers such as acrylic acid, methacrylic acid, crotonic acid, maleic acid, itaconic acid, fumaric acid, isocrotonic acid, salicylic acid, vinyloxyacetic acid, aryloxyacetic acid, 2-(meth)acryloylpropanoic acid, 3-(meth)acryloylbutanoic acid, and 4-vinylbenzoic acid; vinyl cyanide monomers such as (meth)acrylonitrile; (meth)acrylamide; itaconic acid esters such as monomethyl itaconate, monoethyl itaconate, monopropyl itaconate, monobutyl itaconate, dimethyl itaconate, diethyl itaconate, dipropyl itaconate, and dibutyl itaconate; fumaric acid esters such as monomethyl fumarate, monoethyl fumarate, monopropyl fumarate, monobutyl fumarate, dimethyl fumarate, diethyl fumarate, dipropyl fumarate, and dibutyl fumarate; maleic acid esters such as monomethyl malate, monoethyl malate, monopropyl malate, monobutyl malate, dimethyl malate, monoethyl malate, monopropyl malate, monobutyl malate, dimethyl malate, diethyl malate, dipropyl malate, and dibutyl malate; and other vinyl monomers such as vinylpyridine, vinyl alcohol, vinylimidazole, vinylpyrrolidone, vinyl acetate, and 1-vinylimidazole. The term (meth) acrylate according to the present specification represents acrylate or methacrylate. These monomers can be used singly or in combination of two or more kinds thereof.

Among these monomers, a (meth)acrylate, the above-mentioned other functional group-containing (meth)acrylate, and a carboxyl group-containing vinyl monomer are preferred from the viewpoint that radical polymerization is easily achieved, and emulsion polymerization is easily achieved. These monomers can enhance the storage stability of the thermosetting resin compositions thus obtainable.

It is desirable that monomers containing a halogen atom, such as vinyl chloride and vinylidene chloride, are not used since those monomers may cause metal corrosion.

The vinyl polymer particles can be produced according to, for example, the method described in WO 2010/090246 A.

Furthermore, in order to have a thickening ratio such as described above, it is preferable that Component (D) is particles having a core-shell structure. Particularly, core-shell particles formed from an acrylic resin, which is formed by polymerizing at least one monomer selected from the group consisting of various (meth)acrylates and carboxyl group-containing vinyl monomers, are preferred. Furthermore, for the reason that the increase in viscosity is reduced at the time of heating, it is preferable that the content of a compound having two or more ethylenically unsaturated groups in the molecule is 0.5% by mass or less of the total amount of the monomers. Regarding the monomer that constitutes the cores of the vinyl polymer particles, a (meth)acrylate is preferred for the reason that the polymer swells in an epoxy resin and easily causes an increase in viscosity at the time of heating. Regarding the monomer that constitutes the shell, a (meth)acrylate, the above-mentioned other functional group-containing (meth)acrylate, and a carboxyl group-containing vinyl monomer are preferred for the reason that storage stability for epoxy resins at normal temperature can be secured.

The method of checking whether Component (D) has a core-shell structure may be, for example, a method of checking whether the conditions that the particle size of the polymer particles sampled during the polymerization process is reliably growing, and that the minimum film-forming temperature (MFT) and the solubility in various solvents of the polymer particles sampled during the polymerization process undergo any change, are simultaneously satisfied. A method of checking the presence or absence of a concentric structure by observing the Component (D) by transmission electron microscopy (TEM), or a method of checking the presence or absence of a concentric structure by observing fragments of the vinyl polymer particles collected as freeze-fractured aggregates by scanning electron microscopy (cryo-SEM), may also be used.

For the reason that vinyl polymer particles having high stability in an epoxy resin at normal temperature may be obtained, the polymer that constitutes the shell is preferably a polymer having a high glass transition temperature (Tg). Specifically, the Tg of the polymer that constitutes the shell is preferably 60° C. or higher, and more preferably 80° C. or higher, and the Tg is preferably 150° C. or lower, and more preferably 140° C. or lower. When the Tg of the shell is 60° C. or higher, satisfactory storage stability of Component (D) in an epoxy resin is obtained. When the Tg of the shell is 150° C. or lower, since Component (D) sufficiently swells or dissolves in a cured product of an epoxy resin, Component (D) does not remain in a particulate form, and a fiber-reinforced composite material having superior mechanical characteristics is obtained.

Furthermore, from the viewpoint of obtaining vinyl polymer particles that can be easily swollen or dissolved at the time of heating, the Tg of the polymer that constitutes the core is preferably 30° C. or higher, and more preferably 50° C. or higher, and the Tg is preferably 130° C. or lower, and more preferably 110° C. or lower. When the Tg of the core is 30° C. or higher, Component (D) has satisfactory storage stability in an epoxy resin. When the Tg of the core is 130° C. or lower, since Component (D) sufficiently swells or dissolves in a cured product of an epoxy resin, Component (D) does not remain in a particulate form, and a fiber-reinforced composite material having high flexural strength is obtained.

The solubility parameter (SP value) of the shell of the vinyl polymer particles is preferably 20 or higher. Such particles can easily realize a thickening ratio, d1/d0, of 1.0 or lower.

Here, the SP value is determined by inserting the monomer Sp values (Sp(Ui)) of the monomer units that constitute the polymer into Formula (1), as described in WO 2013/077293 A. The Sp(Ui) can be determined by Fedors' method described in Polymer Engineering and Science, Vol. 14, 147 (1974).

[Mathematical Formula 1]

$$Sp値 = \sum_{i=1}^{n}(Mi \times Sp(Ui)) \qquad (1)$$

Sp value wherein in Formula (1), Mi represents the molar fraction of a monomer unit i component, and $\Sigma Mi=1$.

Based on the explanation described above, those skilled persons can easily obtain the Component (D). That is, an ordinarily skilled person can obtain vinyl polymer particles having a thickening ratio of 1.0 or less, by adjusting the volume average primary particle size, Tg, Sp value, and the like based on the explanation given above and with reference to WO 2010/090246 A and WO 2013/077293 A.

<Component E>

The thermosetting resin composition used in the first invention may also include Component (E): a mold releasing agent.

General examples of the mold releasing agent (internal mold releasing agent) include higher fatty acids such as stearic acid, and salts thereof; and compounds containing a fluoroalkyl group, a long-chain alkyl group, and the like.

When the thermosetting resin composition used in the first invention includes Component (D), the surface tackiness of the SMC thus obtainable and the amount of resin flow at the time of molding can be controlled to appropriate ranges. However, a thermosetting resin composition that contains the Component (D) in excess tends to have a decreased curing rate, or a molded product obtainable after curing of the resin composition tends to have decreased toughness. By using Component (E) in combination, deterioration of the curability of the thermosetting resin composition can be suppressed, deterioration of the toughness of a molded product obtainable after curing can be suppressed, and the surface tackiness of the SMC and the amount of resin flow at the time of molding can be controlled more easily to more preferred ranges. In addition, in order to obtain a thermosetting resin composition having appropriate tackiness with a small amount of addition, the Component (E) is preferably a compound containing a fluorine atom.

Examples of commercially available products of the Component (E) include CHEMLEASE IC-35 (manufactured by Chemlease Japan K.K.), ALFLOW H-50TF, ALFLOW AD-281F, ALFLOW E-10 (all manufactured by NOF Corp.), SLIPAX E, SLIPAX O, SLIPAX C10 (all manufactured by Nippon Kasei Chemical Co., Ltd.), DAIFREE FB961, DAIFREE FB962 (all manufactured by Daikin Industries, Ltd.), SURFLON S-611 and SURFLON S-651 (all manufactured by AGC Seimi Chemical Co., Ltd.).

The content of Component (E) is preferably from 0.1 parts by mass to 10 parts by mass with respect to 100 parts by mass of all epoxy resins included in the thermosetting resin composition used in the first invention. When the content is adjusted to 10 parts by mass or less, the adhesiveness between reinforcing fibers and the thermosetting resin composition used in the first invention in the SMC thus obtainable is enhanced, and the fiber-reinforced composite material obtainable by using the SMC can obtain high heat resistance.

<Optional Components>

The thermosetting resin composition used in the first invention may include various well-known additives as necessary, to the extent that the effects of the first invention are not impaired. Examples of the additives include, but are not limited to, a thermoplastic elastomer, elastomer microparticles, core-shell type elastomer microparticles, inorganic particles of silica or the like, a carbonaceous component such as carbon nanotubes, a flame retardant such as a phosphorus compound, and an antifoaming agent.

<Viscosity>

The viscosity of the thermosetting resin composition used in the first invention is preferably from 1 Pa·s to 50 Pa·s at 30° C. When the viscosity is 1 Pa·s or higher, control of the swelling or dissolution of Component (D) is made easy. For example, since Component (D) can be prevented from swelling or dissolving during the process for producing the thermosetting resin composition, or before impregnation of reinforcing fiber bundles with the thermosetting resin composition, the occurrence of defective impregnation can be suppressed. When the viscosity is 50 Pa·s or lower, the Component (D) can be sufficiently swollen or dissolved, and a fiber-reinforced composite material having sufficient mechanical characteristics (flexural strength) can be obtained. A more preferred viscosity is 15 Pa·s or higher and 30 Pa·s or lower.

<Reinforcing Fiber Bundles>

Regarding the reinforcing fiber bundle contained in the SMC and the fiber-reinforced composite material according to the first invention, various reinforcing fiber bundles can be employed according to the applications of the SMC and the fiber-reinforced composite material; however, a fiber bundle formed from short fibers counting in the range of from 3,000 to 60,000 fibers, the bundle having short fibers having a length of from 1 cm to 10 cm, is preferred. Particularly, in regard to the SMC according to the first invention and the fiber-reinforced composite material obtainable from this, a sheet-like object in which fiber bundles formed from the above-mentioned number of short fibers having the above-mentioned length as reinforcing fiber bundles are randomly stacked two-dimensionally, is more preferred.

Specific examples of the reinforcing fibers that constitute the reinforcing fiber bundles include carbon fibers, graphite fibers, aramid fibers, silicon carbide fibers, alumina fibers, boron fibers, tungsten carbide fibers, and glass fibers; however, among them, carbon fibers and glass fibers are preferred, while carbon fibers are more preferred for the reason that carbon fibers have excellent mechanical characteristics such as specific strength and specific elastic modulus. Examples of the form of the reinforcing fibers include roving, roving cloth, chopped strands, and chopped strand mats, and although there are no particular limitations, chopped strands are preferred.

<Method for Preparing Thermosetting Resin Composition>

The thermosetting resin composition used in the first invention can be prepared by an existing method, and examples can include methods of using mixing machines such as a three-roll mill, a planetary mixer, and a kneader. Meanwhile, it is preferable to avoid heating in order not to accelerate swelling or dissolution of Component (D): vinyl polymer particles during the step of preparing the thermosetting resin composition. It is preferable that the temperature of the thermosetting resin composition during the preparation is controlled to be not higher than 60° C.

<SMC>

The SMC according to the first invention contains the thermosetting resin composition and reinforcing fiber bundles described above. For example, it is preferable that the SMC according to the first invention is a product obtainable by sufficiently impregnating a sheet-like object of the above-mentioned fiber bundles with the thermosetting resin composition.

In regard to the method for impregnating a sheet-like object of fiber bundles with the thermosetting resin composition used in the first invention, various known methods can be employed.

For example, a method of producing a pair of films on which the above-mentioned thermosetting resin composition has been uniformly applied, randomly sprinkling reinforcing fiber bundles on the resin composition-coated surface of one of the films, bonding the resin composition-coated surface together with the resin composition-coated surface of the other film to obtain a sheet-like object, pressure bonding and impregnating the sheet-like object, subsequently thickening the sheet-like object at room temperature or under heating with the thickening agent included in the thermosetting resin composition, and thereby deteriorating tackiness, can be employed.

When reinforcing fiber bundles are impregnated with the thermosetting resin composition of the first invention described above, and then the thermosetting resin composition is heated, the Component (D) included in the SMC dissolves or swells in a short time period, and thus, the thermosetting resin composition can be thickened. Thickening of the thermosetting resin composition through dissolution or swelling of the Component (D) is not significantly affected by humidity and air temperature, and the viscosity value after swelling can be easily controlled.

When the thermosetting resin composition is thickened, tackiness of the SMC is suppressed, and a SMC appropriate for the molding operation can be obtained. The temperature at which the Component (D) is dissolved or swollen (thickening temperature) is preferably from 60° C. to 120° C., and the temperature is preferably from 70° C. to 90° C. in consideration of the shelf life of the epoxy curing agent. The time required for thickening may vary depending on the thickening temperature, the kind of the Component (D) and the like; however, the time is usually about 30 minutes at about 80° C.

<Fiber-Reinforced Composite Material>

The fiber-reinforced composite material according to the first invention is obtained by heating and curing the SMC according to the first invention.

In regard to the fiber-reinforced composite material that uses a SMC, for example, one sheet of SMC or a plurality of sheets of SMC are stacked, the SMC sheets are mounted between a pair of forming mold parts, and the SMC is heated at a temperature of from 120° C. to 230° C. for a time of from 2 minutes to 60 minutes to cure the thermosetting resin composition. Thus, a fiber-reinforced composite material as a molded article is obtained. Furthermore, the SMC of the first invention can also be applied to a molded article that is produced by using a honeycomb structure such as a corrugated cardboard as a core material and disposing a SMC on both surfaces or one surface of the core material.

<Second Invention>

The molding material according to a second invention contains reinforcing fibers and an epoxy resin composition that includes the following Components (F) to (H):

(F) an epoxy resin;
(G) dicyandiamide; and
(H) 2,4-diamino-6-[2'-methylimidazolyl-(1')]-ethyl-s-triazine having an average particle size of 15 μm or less.

Preferred embodiments of the second invention will be described below; however, the second invention is not intended to be limited only to these embodiments.

The term "epoxy resin" according to the second invention refers to a compound having one or more epoxy groups in the molecule. Furthermore, the term "epoxy resin composition" means a composition that includes an epoxy resin and a curing agent, and optionally other additives.

The "average particle size" represents, unless particularly stated otherwise, the particle size at a cumulative frequency of 50% (D50) in a particle size distribution that is obtained by measuring a volume-based particle size distribution by a laser diffraction method.

The "reinforcing fiber base material" is an aggregate of reinforcing fibers, and the form thereof will be described below.

<Molding Material>

The molding material of the second invention contains reinforcing fibers and an epoxy resin composition that includes the following Components (F) to (H):

(F) an epoxy resin;
(G) dicyandiamide; and
(H) 2,4-diamino-6-[2'-methylimidazolyl-(1')]-ethyl-s-triazine having an average particle size of 15 μm or less.

<Epoxy Resin Composition>

(Component (F)) Component (F) epoxy resin according to the second invention may be an epoxy resin of a single kind, or a mixture of multiple kinds of epoxy resins.

When a bifunctional or higher-functional epoxy resin is used as Component (F), it is preferable because a cured product of an epoxy resin composition including this component, and further a fiber-reinforced composite material including this cured product, can have high heat resistance. The "bifunctional or higher-functional epoxy resin" as used herein refers to a compound having two or more epoxy groups in the molecule.

Furthermore, when a liquid bisphenol type epoxy resin constitutes 70 parts by mass to 100 parts by mass of 100 parts by mass of Component (F), it is preferable because a cured product of an epoxy resin composition including this component, and further a fiber-reinforced composite material including this cured product can have superior mechanical characteristics. In addition, since the temperature at which dissolution of Component (I): vinyl polymer particles that will be described below in an epoxy resin composition, or swelling of the Component (I) in an epoxy resin composition occurs, can be maintained at an appropriately high temperature, in a case in which a SMC or a BMC is produced using an epoxy resin composition that includes the Components (F) and (I), during the process of impregnating a reinforcing fiber base material with the epoxy resin composition, Component (I) maintains a particulate shape, and therefore, superior impregnating properties are obtained. Also, the tackiness of the SMC and BMC thus obtainable can be controlled to an appropriate range.

Examples of a bifunctional bisphenol type epoxy resin include jER825, jER827, jER828, jER828EL, jER828XA, jER806, jER806H, jER807, jER4004P, jER4005P, jER4007P, and jER4010P (all manufactured by Mitsubishi Chemical Corp.); EPICLON 840, EPICLON 840-S, EPICLON 850, EPICLON 850-S, EPICLON EXA-850CRP, EPICLON 850-LC, EPICLON 830, EPICLON 830-S, EPICLON 835, EPICLON EXA-830CRP, EPICLON EXA-830LVP, and EPICLON EXA-835LV (all manufactured by DIC Corp.); and EPOTOHTO YD-115, EPOTOHTO YD-115G, EPOTOHTO YD-115CA, EPOTOHTO YD-118T, EPOTOHTO YD-127, EPOTOHTO YD-128, EPOTOHTO YD-128G, EPOTOHTO YD-128S, EPOTOHTO YD-128CA, EPOTOHTO YDF-170, EPOTOHTO YDF-2001, EPOTOHTO YDF-2004, and EPOTOHTO YDF-2005RL (all manufactured by Nippon Steel & Sumikin Chemical Co., Ltd.). These may be used singly, or in combination of two or more kinds thereof.

Furthermore, when Component (F) includes a polyfunctional epoxy resin, the heat resistance of a cured product of the epoxy resin composition thus obtainable and further the heat resistance of a fiber-reinforced composite material containing the cured product can be further enhanced. Examples of the polyfunctional epoxy resin include jER152, jER154, jER157S70, jER1031S, jER1032H60, jER604, jER630, and jER630LSD (all manufactured by Mitsubishi Chemical Corp.); N-730A, N-740, N-770, N-775, N-740-80M, N-770-70M, N-865, N-865-80M, N-660, N-665, N-670, N-673, N-680, N-690, N-695, N-665-EXP, N-672-EXP, N-655-EXP-S, N-662-EXP-S, N-665-EXP-S, N-670-EXP-S, N-685-EXP-S, and HP-5000 (all manufactured by DIC Corp.). These may be used singly, or two or more kinds thereof may be used in combination.

(Component (G))

Component (G) is dicyandiamide. Dicyandiamide is an epoxy resin pre-curing agent having superior storage stability. Furthermore, since dicyandiamide realizes high adhesiveness between a cured product of an epoxy resin composition and carbon fibers in a fiber-reinforced composite material that uses carbon fibers as reinforcing fibers, a fiber-reinforced composite material having superior mechanical characteristics can be obtained. However, if dicyandiamide is used alone, an epoxy resin cannot be cured in a short time period at a temperature of 120° C. to 150° C., and when Component (G) is used in combination with Component (H) that will be described below, an epoxy resin composition that can be cured in a short time period and has excellent storage stability is obtained.

The content of Component (G) is preferably from 2 parts by mass to 8 parts by mass with respect to 100 parts by mass of Component (F). When the content is 2 parts by mass or more, an epoxy resin composition can be cured in a shorter time by using Component (G) in combination with Component (H) described below. On the other hand, when the content of Component (G) is 8 parts by mass or less, a cured product having high heat resistance can be obtained.

Furthermore, the particle size of Component (G) affects the characteristics of the epoxy resin composition used in the second invention. For example, in a case in which the particle size is small, the surface area becomes large, and even with a small amount of addition, the epoxy resin composition can be cured in a short time period. Furthermore, in the case of a fiber-reinforced composite material, the Component (G) needs to penetrate into the interior of the reinforcing fiber base material at the time of impregnation of the reinforcing fiber base material with a resin composition; however, when the particle size is small, the proportion of the particles of the Component (G) that penetrates into the interior becomes large, and consequently, the curing times for the molding material, SMC, and BMC according to the second invention are shortened. For such a reason, the average particle size of Component (G) is preferably 20 μm or less, and more preferably 10 μm or less.

Examples of commercially available products of Component (G) dicyandiamide include DICY7, DICY15, and DICY50 (all manufactured by Mitsubishi Chemical Corp.); AMICURE CG-NA, AMICURE CG-325 G, AMICURE CG-1200 G, and Dicyanex 1400F (all manufactured by Air Products and Chemicals, Inc.). However, in order to realize curing of the epoxy resin composition in a short time period and to obtain satisfactory impregnability of the reinforcing fiber base material, it is more preferable as the average particle size of Component (D) is smaller.

(Component (H))

Component (H) according to the second invention is 2,4-diamino-6-[2'-methylimidazolyl-(1')]-ethyl-s-triazine having an average particle size of 15 μm or less, and among imidazole-based curing agents, this compound has very low reactivity with epoxy groups at room temperature, and an epoxy resin composition including this compound has excellent storage stability. Although the component has excellent storage stability, the Component (H) alone cannot cure an epoxy resin composition in a short time period at a temperature of 120° C. to 150° C., and by using Component (G) and Component (H) in combination, an epoxy resin composition that can be cured in a short time period and has excellent storage stability is obtained.

The content of Component (H) is preferably from 4 parts by mass to 10 parts by mass, and most preferably from 4 parts by mass to 8 parts by mass, with respect to 100 parts by mass of Component (F). In a case in which the content is 4 parts by mass or more, when Component (G) is used in combination, rapid curability is obtained. Furthermore, in a case in which the content is 10 parts by mass or less, a fiber-reinforced composite material having sufficient heat resistance is obtained.

Furthermore, the particle size of Component (H) significantly affects the characteristics of the epoxy resin composition used in the second invention. For example, when the particle size is small, the surface area becomes large, and even with a small amount of incorporation, an epoxy resin composition can be cured in a short time period. Furthermore, in the case of a fiber-reinforced composite material, the Component (H) needs to penetrate into the interior of a reinforcing fiber base material at the time of impregnating the reinforcing fiber base material with a resin composition. However, when the particle size is small, the proportion of particles of the Component (H) that penetrates into the interior becomes large, and consequently, the curing times for the molding material, SMC and BMC according to the second invention are shortened. For such a reason, the average particle size of the Component (H) is preferably 15 µm or less, and more preferably 12 µm or less.

As described above, when Component (G) and Component (H) are used singly, the storage stability in the epoxy resin composition is very good; however, it is difficult to cure the epoxy resin composition in a short time period. By using Component (G) and Component (H) in combination, an epoxy resin composition can be cured in a short time period while the initial storage stability is maintained, and a cured product having high heat resistance is obtained.

(Component (I))

It is preferable that the epoxy resin composition of the second invention includes Component (I): vinyl polymer particles having a core-shell structure, in which the core portion has a glass transition temperature of 30° C. to 130° C., and the shell portion has a glass transition temperature of 60° C. to 150° C. When the epoxy resin composition includes Component (I), a balance can be achieved between satisfactory impregnating properties of an epoxy resin composition including this component for a reinforcing fiber base material, and satisfactory handleability and adequate tackiness of a molding material, a SMC, and a BMC consequently obtainable.

Component (I) does not dissolve or swell in an epoxy resin composition at a temperature of normal temperature to about 60° C., and exists as particles that are dispersed. The viscosity of an epoxy resin composition including this component increases only slightly over time. However, for example, at a high temperature of about 80° C. to 90° C., when the Component (I) dissolves in Component (F) or is swollen by Component (F), the viscosity of an epoxy resin composition including this component becomes markedly high. By incorporating Component (I) having such properties into an epoxy resin composition, satisfactory impregnating properties of the epoxy resin composition for a reinforcing fiber base material at a relatively low temperature is realized, and satisfactory tackiness and handleability can be realized in a case in which an epoxy resin composition is used in a SMC, a BMC or a molding material (for example, a thick prepreg). That is, a balance can be achieved between the impregnating properties of an epoxy resin composition for a reinforcing fiber base material, and handleability and tackiness of a molding material, a SMC, a BMC and the like consequently obtainable, which have been conventionally in a trade-off relation.

Furthermore, in the case of a SMC, as the viscosity of the matrix resin composition (epoxy resin composition) included in the SMC increases, fibers flow along with the flow of the matrix resin composition in a metal mold at the time of press molding. Therefore, a fiber-reinforced composite material having a uniform concentration of reinforcing fibers can be obtained, which is preferable.

In order to realize such viscosity characteristics, the polymer that constitutes the shell is preferably a polymer having a high glass transition temperature (Tg), for the reason that vinyl polymer particles having high stability in an epoxy resin at normal temperature are obtainable. Specifically, the Tg of the polymer that constitutes the shell is preferably 60° C. or higher, and more preferably 80° C. or higher, and is preferably 150° C. or lower, and more preferably 130° C. or lower. When the Tg of the shell is 60° C. or higher, the storage stability of Component (I) in an epoxy resin composition at normal temperature becomes satisfactory. When the Tg of the shell is 150° C. or lower, the Component (I) is sufficiently dissolved or swollen by Component (F), at the time of thickening of a SMC, a BMC and a molding material, all of which include such Component (I), or in a heating process at the time of molding. Therefore, the Component (I) does not remain in a particulate form, and a fiber-reinforced composite material having superior mechanical characteristics is obtained.

The Tg of the polymer that constitutes the core of Component (I) is preferably 30° C. or higher, and more preferably 50° C. or higher, and is preferably 130° C. or lower, and more preferably 110° C. or lower. When the Tg of the core is 30° C. or higher, Component (I) exists stably as particles in an epoxy resin composition, and an epoxy resin composition including this component has satisfactory storage stability. When the Tg of the core is 130° C. or lower, the Component (I) is sufficiently swollen or dissolved by the Component (F) at the time of thickening of a SMC, a BMC, and a molding material, all of which include such Component (I), or during the heating process at the time of molding. Therefore, the Component (I) does not remain in a particulate form, and a fiber-reinforced composite material having high flexural strength is obtained.

The content of Component (I) is preferably 10 to 30 parts by mass with respect to 100 parts by mass of Component (F). When the content of Component (I) is adjusted to 10 parts by mass or more, the viscosity of an epoxy resin composition increases to a large extent in a short time period as a result of swelling or dissolution of the Component (I). Therefore, when the epoxy resin composition is used as a matrix resin composition for a SMC or a BMC, the tackiness of the surface can be easily adjusted to an appropriate value.

Furthermore, when the content of Component (I) is adjusted to 30 parts by mass or less, it is preferable because sufficient curability of an epoxy resin composition including this component, and satisfactory mechanical characteristics of a fiber-reinforced composite material obtainable after curing can be obtained.

The volume average primary particle size of Component (I) is preferably 400 nm or larger, more preferably 500 nm or larger, and particularly preferably 600 nm or larger, and the volume average primary particle size is preferably 2,000 nm or smaller, more preferably 1,000 nm or smaller, and particularly preferably 900 nm or smaller. When the volume average primary particle size is adjusted to be 400 nm or larger, thermal stability of the particles themselves is increased. When the volume average primary particle size is adjusted to be 2,000 nm or smaller, on the occasion of impregnating reinforcing fiber bundles with an epoxy resin composition including this component, the epoxy resin composition can penetrate into the interior of the reinforcing fiber bundles, without having the particles filtered out and unevenly distributed at the surface. Thus, a fiber-reinforced composite material having uniform and superior mechanical characteristics and physical characteristics can be obtained.

The volume average primary particle size can be measured using, for example, a conventionally known measuring apparatus such as a laser diffraction scattering type particle size distribution analyzer.

Component (I) is vinyl polymer particles, and can be obtained by polymerizing a radical polymerizable vinyl monomer.

The radical polymerizable vinyl monomer that becomes a raw material of the Component (I) can be selected from, for example, the various vinyl monomers described in WO 2010/090246 A.

Among them, from the viewpoint that radical polymerization is easily achieved, and emulsion polymerization is easily achieved, (meth)acrylic acid, an alkyl (meth)acrylate, and a hydroxyl group-containing (meth)acrylate are preferred. When a Component (I) produced using such a vinyl monomer is used, the storage stability of the epoxy resin composition thus obtainable can be enhanced.

Furthermore, since a monomer containing a halogen atom, such as vinyl chloride or vinylidene chloride, may cause metal corrosion, it is desirable not to use such a monomer.

Vinyl polymer particles can be produced according to, for example, the method described in WO 2010/090246 A.

Since Component (I) has a core-shell structure, the component has high stability in a state of being dispersed in an epoxy resin composition at normal temperature, and Component (I) rapidly dissolves in an epoxy resin (Component (F)) or is rapidly swollen by an epoxy resin, as a result of heating.

The method of checking whether Component (I) has a core-shell structure may be, for example, a method of checking whether the conditions that the particle size of the polymer particles that are sampled in the polymerization process grows reliably, and that the minimum film-forming temperature (MFT) or the solubility in various solvents of the polymer particles that are sampled in the polymerization process, are simultaneously satisfied. A method of checking the presence or absence of a concentric structure by observing the Component (I) by transmission electron microscopy (TEM), or a method of checking the presence or absence of a concentric structure by observing fragments of the vinyl polymer particles collected as freeze-fractured aggregates by scanning electron microscopy (cryo-SEM), may also be used.

<Other Components>

The epoxy resin composition used in the second invention may include components other than Components (F) to (I), and may also include, for example, one or more resins selected from the group consisting of a thermoplastic resin, a thermoplastic elastomer, and an elastomer. Such a resin plays the role of changing the viscoelasticity of an epoxy resin composition, optimizing the viscosity, storage modulus, and thixotropic properties, and also enhancing the toughness of a cured product of an epoxy resin composition. The one or more resins composed of a thermoplastic resin, a thermoplastic elastomer, and an elastomer may be used singly, or two or more kinds thereof may be used in combination.

In addition to that, additives that enhance handleability of a fiber-reinforced composite material, for example, a surfactant that enhances the mold releasing properties of a film, and an internal mold releasing agent that enhances the mold escaping properties from a forming mold, may also be added to the epoxy resin composition.

<Method for Preparing Epoxy Resin Composition>

The epoxy resin composition of the second invention can be prepared by an existing method, and examples include methods of using mixing machines such as a three-roll mill, a planetary mixer, and a kneader. In a case in which an epoxy resin composition including the Component (I) is prepared, it is preferable to avoid heating in order not to accelerate swelling of the Component (I), and it is preferable to control the temperature of the resin composition during preparation to be lower than 80° C., and it is more preferable to control the temperature to be lower than 60° C.

<Reinforcing Fiber Base Material>

The molding material, SMC and BMC according to the second invention each contain the epoxy resin composition described above and reinforcing fibers. Specifically, the molding material, the SMC, and the BMC are each produced by impregnating a fiber base material formed from reinforcing fibers (hereinafter, referred to as "reinforcing fiber base material") with an epoxy resin composition.

Examples of the form of the reinforcing fiber base material include a woven fabric, a nonwoven fabric, a sheet-like form obtained by mixing continuous fibers in one direction, and short fibers (bundles) obtained by evenly cutting continuous fibers into a certain length. For example, in a case in which the molding material is a prepreg, the form of the reinforcing fiber base material may be a sheet-like form obtained by unidirectionally mixing continuous fibers; a form obtained by using continuous fibers as the warp and the weft to produce a woven fabric; a form obtained by unidirectionally mixing tows and holding them as the weft (auxiliary yarns); a form obtained by unidirectionally mixing continuous fibers to obtain sheets of reinforcing fibers, stacking a plurality of the sheets of reinforcing fibers in directions different from each other, fastening the sheets, and thus producing a multiaxial warp knit; or a nonwoven fabric. Among them, from the viewpoint of the ease of producing a prepreg, the form of the reinforcing fiber base material is preferably a sheet-like form obtained by unidirectionally mixing continuous fibers; a form obtained by using continuous fibers as the warp and the weft to produce a woven fabric; a form obtained by unidirectionally mixing tows and holding them as the weft (auxiliary yarns); or a form obtained by unidirectionally mixing continuous fibers to obtain sheets of reinforcing fibers, stacking a plurality of the sheets of reinforcing fibers in directions different from each other, fastening the sheets, and thus producing a multiaxial warp knit. From the viewpoint of strength manifestation of the fiber-reinforced composite material thus obtainable, a sheet-like form obtained by unidirectionally mixing continuous fibers is more preferred.

Furthermore, as the reinforcing fiber base material for a SMC and a BMC, a reinforcing fiber base material formed from short fibers that are obtained by evenly cutting continuous fibers into a certain length, or from short fiber bundles, is used. In the case of a SMC, a sheet-like object in which the short fibers or short fiber bundles are two-dimensionally randomly stacked, is preferred.

Examples of the types of the reinforcing fibers include carbon fibers (including graphite fibers), aramid fibers, silicon carbide fibers, alumina fibers, boron fibers, tungsten carbide fibers, and glass fibers. These reinforcing fiber base materials may be used singly, or two or more kinds thereof may be used in combination. Among these, carbon fibers are suitable because the carbon fibers have excellent specific strength and specific elastic modulus, that is, a molded article (fiber-reinforced composite material) having a fiber direction elastic modulus of 200 GPa or greater is obtained, and thus significant effects for the weight reduction of the molded article are acknowledged.

<Molding Material>

The molding material according to the second invention contains reinforcing fibers and the epoxy resin composition described above. Specific examples of the molding material include a prepreg, a SMC before being subjected to a thickening operation that will be described below (hereinafter, may be referred to as "SMC precursor"), and a BMC before being subjected to a similar thickening operation (hereinafter, may be referred to as "BMC precursor").

<SMC>

The SMC according to the second invention contains reinforcing fibers and a thickened product of the above-mentioned epoxy resin composition. More specifically, the SMC is preferably a product obtained by impregnating a sheet-like object in which short fibers or short fiber bundles obtained by evenly cutting continuous reinforcing fibers to a certain length are two-dimensionally randomly stacked, with the above-described epoxy resin composition, and thickening the epoxy resin composition.

In regard to the method of impregnating a sheet-like object of reinforcing fibers with an epoxy resin composition, various known methods may be used. For example, a method of producing a pair of films on which the epoxy resin composition according to the second invention has been uniformly applied, randomly sprinkling short fibers or short fiber bundles of a reinforcing fiber on the resin composition-coated surface of one of the films, bonding the resin composition-coated surface together with the resin composition-coated surface of the other film to obtain a sheet-like object, pressure bonding and impregnating the sheet-like object, subsequently thickening the sheet-like object at room temperature or under heating with the thickening agent included in the thermosetting resin composition, and thereby deteriorating tackiness, can be employed.

It is preferable that the SMC of the second invention is produced by using an epoxy resin composition that includes Component (I), as described above. When an epoxy resin composition including Component (I) is impregnated into a reinforcing fiber base material and then heated, the Component (I) rapidly dissolves in the Component (F) or is rapidly swollen by the Component (F), and therefore, the epoxy resin composition is thickened in a short time period. Thickening of the epoxy resin composition caused by dissolution or swelling of the Component (I) is not greatly affected by humidity and air temperature, and the viscosity value after swelling can be easily controlled, which is preferable.

When the epoxy resin composition is thickened, tackiness of the SMC is suppressed, and a SMC having satisfactory handleability at the time of molding operation can be obtained. The temperature at which the Component (I) is dissolved or swollen is preferably 60° C. or higher from the viewpoint of the dissolubility or swellability of the Component (I), and in order to prevent the occurrence of a curing reaction of the epoxy resin composition, the temperature is preferably 130° C. or lower, and more preferably 100° C. or lower.

Meanwhile, the viscosity of the epoxy resin composition after thickening is preferably 300 Pa·s or higher at 30° C., and more preferably from 1,000 Pa·s to 100,000 Pa·s. When the viscosity is 300 Pa·s or higher, since the viscosity is sufficiently high, the SMC cutting operation or the like is facilitated. When the viscosity is 100,000 Pa·s or lower, since the viscosity is not excessively high, the epoxy resin composition has satisfactory fluidity within the forming mold at the time of press molding.

<BMC>

The BMC according to the second invention contains reinforcing fibers and a thickened product of the epoxy resin composition described above. More specifically, the BMC is preferably a product obtained by sufficiently mixing short fibers or short fiber bundles produced by evenly cutting continuous reinforcing fibers to a certain length, with the epoxy resin composition described above to obtain a bulk form, and then thickening the epoxy resin composition.

In regard to the method of mixing short fibers or short fiber bundles with the epoxy resin composition according to the second invention into a bulk form, various conventionally known methods can be employed without any particular limitations. However, from the viewpoint of productivity such as the impregnability of fibers with the resin and the dispersibility of the fibers, it is preferable to carry out the mixing using a pressure kneader. At this time, mixing may be carried out under heating as necessary; however, it is desirable that the mixing is carried out at or below the temperature at which resin begins to cure, and preferably at a temperature of from 10° C. to 35° C. Furthermore, at this time, it is not particularly necessary to apply a pressure higher than or equal to the atmospheric pressure; however, in a case in which the viscosity of the epoxy resin composition is high, and in a case in which the resin composition is kneaded, with air being incorporated thereinto, and impregnation of fibers with the resin is made difficult, the mixing may be carried out while a pressure higher than or equal to the atmospheric pressure is applied.

When the epoxy resin composition used in the second invention is mixed with short fibers or short fiber bundles of reinforcing fibers, and then the mixture is heated, the Component (I) included in the BMC is dissolved or swollen in a short time period, and the epoxy resin composition can be thickened. Thickening caused by dissolution or swelling of the Component (I) is not significantly affected by humidity and air temperature, and the viscosity value after swelling can be easily controlled.

By thickening the epoxy resin composition, tackiness of the BMC is suppressed, and thus a BMC having satisfactory handleability at the time of a molding operation can be obtained. The temperature at which Component (I) is dissolved or swollen is preferably 60° C. or higher from the viewpoint of the dissolubility or swellability of the Component (I), and in order to prevent the occurrence of a curing reaction of the epoxy resin composition, the temperature is preferably 130° C. or lower, and more preferably 100° C. or lower.

Meanwhile, the viscosity of the epoxy resin composition after thickening is preferably 500 Pa·s or higher at 25° C., and the viscosity is more preferably 1,000 Pa·s or higher, and more preferably 100,000 Pa·s or lower.

<Fiber-Reinforced Composite Material>

The fiber-reinforced composite material according to the second invention is obtained by heating and curing the molding material, SMC or BMC according to the second invention.

For example, in a case in which a fiber-reinforced composite material is obtained by curing a prepreg, which is one of molding materials, methods such as autoclave molding, vacuum bag molding, and press molding may be mentioned; however, from the viewpoint of utilizing the features of the epoxy resin composition used in the second invention and obtaining a high-quality fiber-reinforced composite material with high productivity, press molding is preferred. It is preferable that the production method used in the case of producing a fiber-reinforced composite material by press molding, includes a step of interposing the prepreg of the second invention or a preform obtained by laminating the prepregs of the second invention in between metal mold parts that have been adjusted in advance to the curing temperature, and heating and pressing the prepreg or the preform.

The temperature inside the metal mold at the time of press molding is preferably 100° C. to 150° C. Furthermore, at the time of press molding, it is preferable to cure the prepreg or the preform for 1 to 20 minutes under the conditions of the above-mentioned temperature and a pressure of 1 to 15 MPa.

In a case in which a fiber-reinforced composite material is produced by performing press molding under the conditions described above, in order to avoid any undesirable deformation when the fiber-reinforced composite material from the metal mold after press molding, it is desirable that the glass transition temperature of the fiber-reinforced composite material after curing, particularly G'–Tg that is determined as the temperature at which the storage modulus of rigidity (G') begins to decrease, is higher than the temperature inside the mold at the time of molding. For example, for a fiber-reinforced composite material produced by interposing a prepreg obtained by impregnating a reinforcing fiber base material with an epoxy resin composition, in between metal mold parts that have been preheated to 140° C., pressing the prepreg at 1 MPa, and maintaining the prepreg for 5 minutes, the G'–Tg is preferably 150° C. or higher. Here, G'–Tg means the glass transition temperature determined by the method described below, based on the temperature dependency of the storage modulus of rigidity (G') obtainable by measuring the dynamic viscoelasticity of a cured product of an epoxy resin composition.

A fiber-reinforced composite material that uses a SMC is obtained by, for example, stacking one sheet of SMC or a plurality of sheets of SMC, mounting the SMC between a pair of forming molds, heating the SMC for 2 to 10 minutes at 120° C. to 180° C., and thereby curing the epoxy resin composition. Furthermore, the SMC of the second invention can also be applied to a molded article that is produced by using a honeycomb structure such as a corrugated cardboard as a core material, and disposing a SMC on both surfaces or on one surface.

The fiber-reinforced composite material that uses a BMC can be obtained by any molding method such as compression molding, transfer molding, or injection molding; however, since the resin used in the second invention has high resin viscosity near room temperature in many cases, even a molded article having a complex shape can be obtained in a short time period by using compression molding, by which the BMC of the second invention is press fitted into a metal mold having a predetermined shape, and then the BMC is cured by heating and pressing the mold.

The invention is not limited to the various embodiments described above, and various modifications can be made within the scope disclosed in the claims. Embodiments obtainable by appropriately combining the technical means disclosed in different embodiments are also included in the technical scope of the invention.

[Supplementary Information]

A sheet-molding compound according to the first invention is a sheet-molding compound comprising a thickened product of a thermosetting resin composition and reinforcing fiber bundles, in which the thermosetting resin composition includes Component (A): a liquid epoxy resin having a viscosity at 25° C. of 1 Pa·s or higher; Component (B): an epoxy resin curing agent; and Component (D): vinyl polymer particles, the content of the Component (D) is from 10 parts by mass to 30 parts by mass with respect to 100 parts by mass of the total amount of epoxy resins included in the thermosetting resin composition, the attained viscosity of a thickened product of the thermosetting resin composition is from 150 Pa·s to 20,000 Pa·s, while the minimum viscosity is from 2 Pa·s to 600 Pa·s, and the attained viscosity is higher than the minimum viscosity.

Furthermore, in the sheet-molding compound according to the first invention, in regard to the Component (D), it is more preferable that a dispersion obtainable by dispersing the Component (D) a bisphenol A type epoxy resin having an epoxy equivalent of 190±6 g/eq has a thickening ratio, $d_1/d_0$ (provided that $d_0$ represents the viscosity obtainable immediately after the preparation of a dispersion obtained by dispersing 30 parts by mass of the Component (D) in 100 parts by mass of the bisphenol A type epoxy resin at 30° C.; and $d_1$ represents the viscosity obtainable after heating the dispersion to 60° C., and maintaining the dispersion for one hour at 60° C. after the heating), of 1.0 or less.

Furthermore, in the sheet-molding compound according to the first invention, in regard to Component (D), it is more preferable that a dispersion obtainable by dispersing the Component (D) in a bisphenol F type epoxy resin having an epoxy equivalent of 168±8 g/eq has a thickening ratio, $d_1'/d_0'$ (provided that $d_0'$ represents the viscosity obtainable immediately after the preparation of a dispersion obtained by dispersing 30 parts by mass of the Component (D) with respect to 100 parts by mass of the bisphenol F type epoxy resin at 30° C.; and $d_1'$ represents the viscosity obtainable after heating the dispersion to 60° C., and maintaining the dispersion for one hour at 60° C. after the heating), of 1.0 or less.

A sheet-molding compound according to the first invention is a sheet-molding compound comprising a thickened product of a thermosetting resin composition and reinforcing fiber bundles, in which the thermosetting resin composition includes Component (A): a liquid epoxy resin having a viscosity at 25° C. of 1 Pa·s or higher; Component (B): an epoxy resin curing agent; and Component (D): vinyl polymer particles, the content of the Component (D) is from 10 parts by mass to 30 parts by mass with respect to 100 parts by mass of the total amount of epoxy resins included in the thermosetting resin composition, and in regard to the Component (D), a dispersion obtainable by dispersing the Component (D) in a bisphenol A type epoxy resin having an epoxy equivalent of 190±6 g/eq has a thickening ratio, $d_1/d_0$ (provided that $d_0$ represents the viscosity obtainable immediately after the preparation of a dispersion obtained by dispersing 30 parts by mass of the Component (D) in 100 parts by mass of the bisphenol A type epoxy resin at 30° C.; and $d_1$ represents the viscosity obtainable by heating the dispersion to 60° C. and maintaining the dispersion for one hour at 60° C. after the heating), of 1.0 or less.

Furthermore, in regard to the sheet-molding compound according to the first invention, it is more preferable that the viscosity at 30° C. of the thermosetting resin composition is from 1 Pa·s to 50 Pa·s.

In regard to the sheet-molding compound according to the first invention, it is more preferable that the Component (D) is particles formed from an acrylic resin.

In regard to the sheet-molding compound according to the first invention, it is more preferable that the Component (D) is core-shell particles.

In regard to the sheet-molding compound according to the first invention, it is more preferable that the glass transition temperature of the core in the core-shell particles is 30° C. or higher.

In regard to the sheet-molding compound according to the first invention, it is more preferable that the glass transition temperature of the shell in the core-shell particles is 60° C. or higher.

In regard to the sheet-molding compound according to the first invention, it is more preferable that the solubility parameter (SP value) of the shell in the core-shell particles is 20 or greater.

In regard to the sheet-molding compound according to the first invention, it is more preferable that the shell in the core-shell particles is formed from a polymer of at least one monomer selected from the group consisting of an acrylate, a methacrylate, and a carboxylic acid-containing vinyl monomer, and that the content of a compound having two or more ethylenically unsaturated groups in the molecule is 0.5% by mass or less of the total amount of the monomers.

In regard to the sheet-molding compound according to the first invention, it is more preferable that the volume average primary particle size of the Component (D) is from 500 nm to 1,000 nm.

In regard to the sheet-molding compound according to the first invention, it is more preferable that the Component (A) is a bisphenol A type epoxy resin.

In regard to the sheet-molding compound according to the first invention, it is more preferable that the thermosetting resin composition further includes Component (C): an epoxy resin curing accelerator.

In regard to the sheet-molding compound according to the first invention, it is more preferable that the thermosetting resin composition further includes Component (E): a mold releasing agent.

In regard to the sheet-molding compound according to the first invention, it is more preferable that the thermosetting resin composition further includes Component (C): an epoxy resin curing accelerator, and the Component (B) is dicyandiamide, while the Component (C) is 2,4-bis(3,3-dimethylurae)toluene.

In regard to the sheet-molding compound according to the first invention, it is more preferable that the reinforcing fiber bundles are carbon fiber bundles.

A fiber-reinforced composite material according to the first invention is a cured product of the sheet-molding compound.

A molding material according to the second invention contains reinforcing fibers and an epoxy resin composition that includes the following Components (F) to (H): (F) an epoxy resin, (G) dicyandiamide, and (H) 2,4-diamino-6-[2'-methylimidazolyl-(1')]-ethyl-s-triazine having an average particle size of 15 µm or less.

In regard to the molding material according to the second invention, it is more preferable that Component (F) in the epoxy resin composition includes 70% to 100% by mass of a bisphenol type epoxy resin that is liquid at 25° C., the content of the Component (G) is 2 to 8 parts by mass with respect to 100 parts by mass of the Component (F), and the content of the Component (H) is 4 to 10 parts by mass with respect to 100 parts by mass of the Component (F).

It is more preferable that the molding material according to the second invention further contains Component (I): vinyl polymer particles having a core-shell structure, in which the glass transition temperature of the core portion is 30° C. to 130° C., and the glass transition temperature of the shell portion is 60° C. to 150° C., and the content of the Component (I) is 10 to 30 parts by mass with respect to 100 parts by mass of the Component (F).

In regard to the molding material according to the second invention, it is more preferable that the reinforcing fibers are carbon fibers.

A sheet-molding compound according to the second invention contains reinforcing fibers and a thickened product of an epoxy resin composition including the following Components (F) to (I): Component (F): an epoxy resin, Component (G): dicyandiamide, Component (H): 2,4-diamino-6-[2'-methylimidazolyl-(1')]-ethyl-s-triazine, and Component (I): vinyl polymer particles having a core-shell structure, in which the glass transition temperature of the core portion is 30° C. to 130° C., and the glass transition temperature of the shell portion is 60° C. to 150° C.

In regard to the sheet-molding compound according to the second invention, it is more preferable that the reinforcing fibers are carbon fibers.

It is more preferable that the fiber-reinforced composite material according to the second invention is a cured product of the molding material.

It is also more preferable that the fiber-reinforced composite material according to the second invention is a cured product of the sheet-molding compound.

A bulk molding compound according to the second invention contains reinforcing fibers and a thickened product of an epoxy resin composition including the following Components (F) to (I): Component (F): an epoxy resin, Component (G): dicyandiamide, Component (H): 2,4-diamino-6-[2'-methylimidazolyl-(1')]-ethyl-s-triazine having an average particle size of 15 µm or less, and Component (I): vinyl polymer particles having a core-shell structure, in which the glass transition temperature of the core portion is 30° C. to 130° C., and the glass transition temperature of the shell portion is 60° C. to 150° C.

In regard to the bulk molding compound according to the second invention, it is more preferable that the reinforcing fibers are carbon fibers.

It is more preferable that the fiber-reinforced composite material according to the second invention is a cured product of the bulk molding compound.

EXAMPLES

<Examples Related to First Invention>

Hereinafter, the first invention will be specifically explained by way of the Examples related to the first invention; however, the first invention is not intended to be limited to these Examples.

[Raw Materials]

<Component A>

Bisphenol A type liquid epoxy resin (manufactured by Mitsubishi Chemical Corp., product name "jER828")

Bisphenol F type liquid epoxy resin (manufactured by Mitsubishi Chemical Corp., product name: "jER807")

<Component B>
Dicyandiamide (manufactured by Mitsubishi Chemical Corp., product name "DICY15")
Dicyandiamide (manufactured by Air Products and Chemicals Inc., product name "Dicyanex 1400F")
2,4-Diamino-6-[2'-methylimidazolyl-(1')]-ethyl-s-triazine (manufactured by Shikoku Chemicals Corp., product name "2MZA-PW")
<Component C>
2,4-Bis(3,3-dimethylurea)toluene (manufactured by Emerald Performance Materials, LLC, product name "OMICURE U-24")
<Component D>
Vinyl polymer particles were produced under the following conditions.

[Production of Vinyl Polymer Particles A, B, and D (Composition Table 1)]

Pure water was introduced into a 2-liter, four-necked flask equipped with a thermometer, a nitrogen gas inlet tube, a stirring rod, a dropping funnel, and a cooling tube. The weights of pure water used to produce various vinyl polymer particles were as indicated in the second row of Composition Table 1. Next, the flask was sufficiently ventilated with nitrogen gas for 30 minutes, and any dissolved oxygen in the pure water was purged. After the ventilation with nitrogen gas was stopped, the temperature was raised to 80° C. while the water was stirred at 200 rpm. At the time point where the internal temperature had reached 80° C., predetermined amounts of a monomer mixture (M1), potassium persulfate as an initiator, and pure water were respectively introduced into the flask, and polymerization was carried out for one hour. Subsequently, a predetermined amount of a monomer mixture (M2) was introduced into the flask by dropwise addition.

Next, after the heat generation caused by polymerization of the monomer mixture (M2) had ceased, the reaction mixture was maintained for one hour, and a predetermined amount of a monomer mixture (M3) was introduced into the flask. After the introduction of the monomer mixture (M3), stirring was continued for one hour at 80° C., and thereby a polymer particle dispersion liquid of vinyl polymer particles of each kind was obtained. The polymer particle dispersion liquid of the vinyl polymer particles was spray-dried (inlet temperature/outlet temperature=150° C./65° C., speed of disc rotation: 25,000 rpm) using an L-8 type spray dryer (manufactured by Ohkawara Kakohki Co., Ltd.), and thus vinyl polymer particles were obtained.

[Production of Vinyl Polymer Particles C (Composition Table 1)]

544 g of pure water was introduced into a 2-liter, four-necked flask equipped with a thermometer, a nitrogen gas inlet tube, a stirring rod, a dropping funnel, and a cooling tube. The flask was sufficiently ventilated with nitrogen gas for 30 minutes, and any dissolved oxygen in the pure water was purged. After the ventilation with nitrogen gas was stopped, the temperature was raised to 80° C. while the water was stirred at 200 rpm. At the time point where the internal temperature had reached 80° C., a monomer mixture (M1), 0.16 g of potassium persulfate as an initiator, and 20.0 g of pure water were introduced into the flask, and polymerization was carried out for one hour. Subsequently, a monomer mixture (M2) was introduced into the flask by dropwise addition.

Next, after the heat generation caused by polymerization of the monomer mixture (M2) had ceased, the reaction mixture was maintained for one hour, 1.60 g of KPS and 40.0 g of pure water were introduced into the flask, and a monomer mixture (M3) was introduced into the flask. Subsequently, after the heat generation caused by polymerization of the monomer mixture (M3) had ceased, a predetermined amount of a monomer mixture (M4) was introduced into the flask. Furthermore, after the introduction of the monomer mixture (M4), stirring was continued for one hour at 80° C., and thus a polymer particle dispersion liquid of vinyl polymer particles C was obtained. The polymer particle dispersion liquid of vinyl polymer particles C was spray-dried (inlet temperature/outlet temperature=150° C./65° C., speed of disc rotation: 25,000 rpm) using an L-8 type spray dryer (manufactured by Ohkawara Kakohki Co., Ltd.), and thus vinyl polymer particles C were obtained.

TABLE 1

| Composition Table 1 Vinyl polymer particles A, B, C, and D | | | | | | |
|---|---|---|---|---|---|---|
| | | | Vinyl polymer particles A | Vinyl polymer particles B | Vinyl polymer particles C | Vinyl polymer particles D |
| Core component | Monomer mixture (M1) | Pure water (g) | 584 | 546 | 544 | 544 |
| | | MMA (g) | 26.1 | 26.1 | 26.1 | 26.1 |
| | | n-BMA (g) | 19.9 | 19.9 | 19.9 | 19.9 |
| | | KPS (g) | 0.4 | 0.4 | 0.16 | 0.4 |
| | | Pure water (g) | 19.6 | 20 | 20 | 16 |
| | Monomer mixture (M2) | MMA (g) | 205.5 | 299.2 | 317.4 | 334.1 |
| | | n-BMA (g) | 194.5 | — | 242.6 | — |
| | | t-BMA (g) | — | 347.4 | — | 316.1 |
| | | 2-HEMA (g) | — | 25.4 | — | 21.7 |
| | | GMA (g) | — | — | 4 | — |
| | | PELEX OT-P (g) | 3.6 | 7.3 | 4 | 6.1 |
| | | EMULGEN 106 (g) | — | — | 1.6 | — |
| | | AIBN (g) | — | — | 0.24 | — |
| | | Pure water (g) | 200 | 479 | 280 | 251.2 |
| | | KPS (g) | — | — | 1.6 | — |
| | | Pure water (g) | — | — | 40 | — |
| Shell Component | Monomer mixture (M3) | MMA (g) | 382.7 | 62.6 | 219.1 | 77 |
| | | n-BMA (g) | — | 9.9 | — | — |
| | | MAA (g) | 17.3 | — | 20.9 | — |
| | | 2-HEMA (g) | — | 7.4 | — | 3 |
| | | OTG (g) | — | — | 0.9 | — |
| | | PELEX OT-P (g) | 4 | 0.8 | 2.4 | 0.8 |
| | | EMULGEN 106 (g) | 4 | — | 2.4 | — |
| | | Pure water (g) | 200 | 44 | 120 | 28 |

TABLE 1-continued

Composition Table 1 Vinyl polymer particles A, B, C, and D

|  | | Vinyl polymer particles A | Vinyl polymer particles B | Vinyl polymer particles C | Vinyl polymer particles D |
|---|---|---|---|---|---|
| Monomer mixture (M4) | MAA (g) | — | — | 3.1 | — |
|  | Pure water (g) | — | — | 62.5 | — |
| Time for dropwise addition of monomer mixture (M2) (min) | | 150 | 270 | 180 | 270 |
| Time for dropwise addition of monomer mixture (M3) (min) | | 150 | 30 | 90 | 30 |
| Time for dropwise addition of monomer mixture (M4) (min) | | — | — | 15 | — |
| Shell Tg [° C.] | | 109.1 | 85.0 | 114.4 | 102.0 |
| Shell SP value [$(J/cm^3)^{1/2}$] | | 20.58 | 20.77 | 20.92 | 20.53 |
| Core Tg [° C.] | | 58.7 | 100.1 | 62.7 | 100.4 |
| Core SP value [$(J/cm^3)^{1/2}$] | | 19.92 | 19.82 | 19.98 | 19.85 |
| Primary particle size [nm] | | 700 | 700 | 700 | 700 |
| Secondary particle size [μm] | | 70 | 70 | 70 | 70 |

Abbreviations in Composition Table 1 represent the following compounds.

MMA: Methyl methacrylate
n-BMA: n-Butyl methacrylate
i-BMA: i-Butyl methacrylate
t-BMA: t-Butyl methacrylate
MAA: Methacrylic acid
2-HEMA: 2-Hydroxyethyl methacrylate
GMA: Glycidyl methacrylate
AAEM: 2-Acetoacetoxyethyl methacrylate
PELEX OT-P: Sodium dialkyl sulfosuccinate (trade name, manufactured by Kao Corp.)
KPS: Potassium persulfate
EMULGEN 106: Polyoxyethylene lauryl ether (trade name, manufactured by Kao Corp.)
AIBN: Azobisisobutyronitrile
V-65: 2,2'-Azobis(2,4-dimethylvaleronitrile) (trade name, manufactured by Wako Pure Chemical Industries, Ltd.)
OTG: 2-Ethylhexyl thioglycolate (trade name, manufactured by Yodo Kagaku Co., Ltd.)

<Component E>
FB-962: "DAIFREE FB-962" (fluorine-containing non-silicone-based mold releasing agent, manufactured by Daikin Industries, Ltd., trade name)
MOLDWIZ INT-1882 (fatty acid ester-based mold releasing agent, Axel Plastics Research Laboratories, Inc., trade name)

<Reinforcing Fiber Bundles>
Carbon fiber bundle: Tensile strength 4.9 GPa, tensile modulus 240 GPa, number of filaments 15,000 filaments, basis weight 1.0 g/m (manufactured by Mitsubishi Rayon Co., Ltd., product name "TR50S15L")
Carbon fiber bundle: Tensile strength 4.9 GPa, tensile modulus 240 GPa, number of filaments 12,000 filaments, basis weight 0.8 g/m (manufactured by Mitsubishi Rayon Co., Ltd., product name "TR50S12L")

[Production of Curing Agent Master Batch]

An epoxy resin and an epoxy resin curing agent were weighed in a container at a ratio of 1:1 as a mass ratio, and the compounds were stirred and mixed. This was more thoroughly mixed with a three-roll mill, and thus a curing agent master batch was obtained.

[Method for Preparing Thermosetting Resin Composition]

Predetermined amounts of Component (A) to Component (E) were respectively dispensed into a glass flask. Subsequently, the components were stirred using a stirring blade in a water bath at about 50° C. until the mixture became uniform, and thus a thermosetting resin composition was prepared.

[Viscosity Measurement Method]

Viscosity was measured using a rheometer VAR-100 (manufactured by Reologica Instruments AB). The measurement conditions are shown below.

Measurement mode: Constant stress. Stress value 300 Pa
Frequency: 1.59 Hz
Plate diameter: 25 mm
Plate type: Parallel plates
Plate gap: 0.5 mm
Plate temperature at the time of measurement: 30° C. or 60° C.

[Production Method for SMC, and Evaluation Methods for Drapability, Film Mold Releasability, Tackiness, and Impregnating Properties]

A thermosetting resin composition was uniformly applied on a polyethylene film such that the coating amount would be 750 g/m$^2$, and two sheets of resin films were produced. On the thermosetting resin composition-coated surface of one of the two sheets of resin films, carbon fibers (TR50S12L) that had been chopped to about 2.5 cm were randomly sprinkled from right above the resin film such that the fiber quantity would be 1,500 g/m$^2$. The thermosetting resin composition-coated surface of that resin film was pasted together with the thermosetting resin composition-coated surface of the other resin film from right above, and thus an unimpregnated, unthickened SMC having a total amount of 3,000 g/m$^2$ was produced. This unimpregnated, unthickened SMC was sufficiently treated under pressure with heating so as to induce impregnation of the thermosetting resin composition, and then the SMC was introduced into an oven at 80° C. for 30 minutes to cause thickening of the thermosetting resin composition. Thus, a SMC was obtained.

[Method for Determining Volume Average Primary Particle Size of Component D]

An emulsion of vinyl polymer particles was diluted with ion-exchanged water, and the volume average primary particle size was measured as the emulsion particle size, using a laser diffraction scattering type particle size distribution analyzer (LA-910W manufactured by Horiba, Ltd.).

[Method for Determining Tg's of Shell and Core of Component D]

Tg is defined as the value that can be determined from Fox's Formula (2) shown below. Specifically, in a case in which the polymer was a homopolymer, the standard analytic values described in "Polymer Data Handbook" edited by the Society of Polymer Science, Japan were employed, and in a case in which the polymer was a copolymer of n kinds of monomers, the Tg was calculated from the Tg values of the various monomers. Table 2 shows the literature data of Tg's of representative homopolymers.

[Mathematical Formula 2]

$$\frac{1}{Tg + 273} = \sum_{i=1}^{n} \frac{Wi}{Tgi + 273} \qquad (2)$$

wherein Tg represents the glass transition temperature (° C.) of vinyl polymer particles; Tgi represents the glass transition temperature (° C.) of a homopolymer of component i; Wi represents the mass ratio of component i; and ΣWi=1.

TABLE 2

|  | Sp(ui) $(J/cm^3)^{1/2}$ | Tg ° C. |
|---|---|---|
| MMA | 20.32 | 105 |
| n-BMA | 19.32 | 20 |
| i-BMA | 18.95 | 60 |
| t-BMA | 18.56 | 107 |
| 2-HEMA | 27.55 | 38 |
| St | 20.08 | 100 |
| GMA | 21.96 | 46 |
| MAA | 25.64 | 228 |

[Method for Determining SP Values of Shell and Core of Component D]

The SP values were determined by inserting the SP values of monomers (Sp(Ui)) of the repeating units in the polymers that constituted the shell and the core, into the following Formula (3). Sp(Ui) values were determined by Fedors' method described in Polymer Engineering and Science, Vol. 14, 147 (1974). Furthermore, the SP values of representative monomers (Sp(Ui)) are presented in Table 2 (provided that in regard to the SP value of GMA, the value described in JP 2000-1633 A was employed).

[Mathematical Formula 3]

$$Sp値 = \sum_{i=1}^{n} (Mi \times Sp(Ui)) \qquad (3)$$

Sp value
wherein M1 represents the molar fraction of monomer unit component I; and ΣMi=1.

<Method for Measuring Attained Viscosity of Resin Thickened Product>

For the thermosetting resin compositions thus obtained, the attained viscosity of a thickened product of a thermosetting resin composition was measured by the following method.

First, the plate temperature of a rheometer was set to be from 80° C. to 90° C. After it was confirmed that the temperature inside an oven became steady, an appropriate amount of a thermosetting resin composition before thickening was dispensed on the plate. The gap between the plates was adjusted to 0.5 mm, and the thermosetting resin composition was maintained at 80° C. or 90° C. for 30 minutes.

Subsequently, the thermosetting resin composition was cooled to 30° C. using a spot cooler. After cooling, the viscosity at 30° C. was measured, and this was designated as the attained viscosity. Meanwhile, the measurement mode, frequency, plate diameter, plate type, and plate gap employed at the time of measurement were as described in the section [Viscosity measurement method].

<Method for Measuring Minimum Viscosity of Resin Thickened Product>

A thermosetting resin composition thus obtained was subjected to temperature increase up to 120° C. at a rate of 2° C./min, and the viscosity was measured using a rheometer. The lowest viscosity that was obtained at that time was designated as the minimum viscosity of the thickened product. Furthermore, the measurement mode, frequency, plate diameter, plate type, and plate gap employed at the time of measurement were similar to those employed at the time of measuring the attained viscosity described above.

<Drapability>

Drapability of a SMC immediately after production at room temperature of 23° C., and drapability of a SMC that had been maintained as received at 23° C. for two weeks were evaluated by tactile sensation. The evaluation criteria are shown below.

◯: The SMC has flexibility appropriate for work, and has satisfactory handleability.

x: The SMC has no flexibility appropriate for work, and has poor handleability.

<Film Mold Releasability>

Film mold releasability was evaluated by manually peeling off the film of a SMC produced at room temperature of 23° C. The evaluation criteria are shown below.

⊙: The film is neatly peeled off without any problem.

◯: The SMC can be used for work; however, marks of resin slightly remained on the film.

x: It is difficult to peel off the film.

<Tackiness>

The film of a SMC immediately after production at room temperature of 23° C. was manually peeled off, and the SMC was evaluated for tactile sensation. Furthermore, a SMC that had been produced similarly and maintained at 23° C. for two weeks was also evaluated similarly for tactile sensation. The evaluation criteria are shown below.

⊙: The SMC has adequate tackiness. No problem.

◯: The SMC can be used for work; however, the SMC has slightly strong tackiness.

x: The SMC has strong tackiness, and it is difficult to use the SMC for work.

<Impregnability>

A SMC thus produced was cut at room temperature of 23° C., and the extent of impregnation of carbon fiber bundles with a thermosetting resin composition was checked by visual inspection. The evaluation criteria are shown below.

◯: The carbon fiber bundles are entirely impregnated with the thermosetting resin composition.

x: Impregnability was insufficient, and dry carbon fiber bundles were found here and there, and were insufficiently impregnated.

Reference Example 1

100 parts by mass of jER828 was dispensed into a clean vessel, 30 parts by mass of vinyl polymer particles A were added thereto, and the mixture was dispersed by Program CH10 of a defoaming stirrer, "MAZERUSTAR KK-2000", manufactured by Kurabo Industries, Ltd. The viscosity at 30° C. of the thermosetting resin composition having the vinyl polymer particles A dispersed therein was measured according to the viscosity measurement method described above. Furthermore, the temperature was set to 60° C., the thermosetting resin composition was heated for one hour, and then the viscosity was measured by the same measurement method. The results are presented in Table 3. As a result of the measurement, the viscosity at 30° C. was 14 Pa·s, and the viscosity obtained when the resin composition was heated for one hour at 60° C. was 0.9 Pa·s. The ratio was 0.06.

Reference Examples 2 to 4

Thermosetting resin compositions were prepared in the same manner as in Reference Example 1, except that the vinyl polymers described in Table 1 were used instead of the vinyl polymer particles A, and viscosity measurement was performed. The results are presented in Table 3.

Reference Example 5

100 parts by mass of jER807 was dispensed into a clean vessel, 30 parts by mass of vinyl polymer particles A were added thereto, and the mixture was dispersed by Program CH10 of a defoaming stirrer, MAZERUSTAR. The viscosity at 30° C. of the thermosetting resin composition having the vinyl polymer particles dispersed therein was measured with a rheometer, VAR-100. Furthermore, the temperature was set to 60° C., the thermosetting resin composition was heated for one hour, and then the viscosity was measured by the same measurement method. The results are presented in Table 3. As a result of the measurement, the viscosity at 30° C. was 5.3 Pa·s, and the viscosity obtained when the resin composition was heated for one hour at 60° C. was 3.5 Pa·s. The ratio was 0.66.

Reference Examples 6 to 8

Resin compositions were prepared in the same manner as in Reference Example 5, except that the vinyl polymers described in Table 3 were used instead of the vinyl polymer particles A, and viscosity measurement was performed. The results are presented in Table 3.

TABLE 3

Resin compositions [g] of Reference Examples 1 to 8 and viscosity measurement results

| | Reference Example 1 | Reference Example 2 | Reference Example 3 | Reference Example 4 |
|---|---|---|---|---|
| jER828 | 100 | 100 | 100 | 100 |
| Vinyl polymer particles A | 30 | | | |
| Vinyl polymer particles B | | 30 | | |
| Vinyl polymer particles C | | | 30 | |
| Vinyl polymer particles D | | | | 30 |
| 30° C. viscosity [Pa · s] | 14.0 | 14.0 | 14.0 | 14.0 |
| 60° C. viscosity [Pa · s] | 0.9 | 1.6 | 0.8 | 1.0 |
| 60° C. viscosity/30° C. viscosity | 0.06 | 0.11 | 0.06 | 0.07 |

| | Reference Example 5 | Reference Example 6 | Reference Example 7 | Reference Example 8 |
|---|---|---|---|---|
| jER807 | 100 | 100 | 100 | 100 |
| Vinyl polymer particles A | 30 | | | |
| Vinyl polymer particles B | | 30 | | |
| Vinyl polymer particles C | | | 30 | |
| Vinyl polymer particles D | | | | 30 |
| 30° C. viscosity [Pa · s] | 5.3 | 6.8 | 5.9 | 6.0 |
| 60° C. viscosity [Pa · s] | 3.5 | 2.6 | 0.6 | 3.9 |
| 60° C. viscosity/30° C. viscosity | 0.66 | 0.38 | 0.10 | 0.65 |

Reference Examples 1 to 8 had small increases in viscosity, and the possibility that viscosity may increase during the SMC production process is low.

The following shows examples of actually producing SMCs and performing evaluation.

Example 1

A thermosetting resin composition including the various components described in Table 4 was prepared.

First, a curing agent master batch was prepared according to the section [Preparation of curing agent master batch] described above, using DICY15, which is an epoxy resin curing agent, and jER828, which is an epoxy resin. Next, the remaining portion of jER828 (92 parts by mass), 30 parts by mass of vinyl polymer microparticles A, 5 parts by mass of OMICURE 24, and 1 part by mass of FB-962 were dispensed into a reaction vessel, and a thermosetting resin composition was prepared according to the [Method for preparing thermosetting resin composition] described above.

The thermosetting resin composition thus obtained was uniformly applied on a polyethylene film such that the coating amount would be 750 g/m$^2$, and two sheets of resin films were produced. On the thermosetting resin composition-coated surface of one of the two sheets of resin films, carbon fiber bundles (TRS0S12L) that had been chopped to about 2.5 cm were randomly sprinkled from right above the resin film such that the fiber quantity would be 1,500 g/m$^2$. The thermosetting resin composition-coated surface of that resin film was pasted together with the thermosetting resin composition-coated surface of the other resin film from right above, and thus an unimpregnated, unthickened SMC having a total amount of 3,000 g/m$^2$ was produced. The carbon fiber bundles in this unimpregnated, unthickened SMC were impregnated with the thermosetting resin composition using a fusing press machine, JR-600LTSW (manufactured by Asahi Corp.). The conditions for the fusing press machine were such that the temperature of the press roll was set to 90° C., the set pressure of the press roll was 0.05 MPa, and the line speed was 1.5 m/min. After passing the fusing press machine, the unthickened SMC was introduced into an oven at 80° C. for 30 minutes to cause thickening of the thermosetting resin composition. Thus, a SMC was obtained.

For the SMC thus obtained, drapability, film mold releasability, tackiness, and impregnability were evaluated. The results are presented in Table 4. Furthermore, for the thermosetting resin composition thus prepared, the attained viscosity and the minimum viscosity of the resin thickened product were measured according to the attained viscosity measurement method and the minimum viscosity measurement method described above. Furthermore, the viscosities at 30° C. and 60° C. were measured in the same manner as in Reference Example 1 according to the viscosity measurement methods described above. The results are presented in Table 4. The "thickening temperature" in Table 4 means the temperature at which the SMC is maintained for 30 minutes in connection with the attained viscosity measurement method described above.

Examples 2 to 20 and 23 to 25, and Comparative Examples 1 to 9

Thermosetting resin compositions described in Table 4 to Table 9 were prepared in the same manner as in Example 1, and SMCs were produced using these resin compositions. For the SMCs thus obtained, drapability, film mold releasability, tackiness, and impregnability were evaluated. Furthermore, for the various thermosetting resin compositions thus prepared, the attained viscosity and the minimum viscosity of the resin thickened products were measured. The viscosities at 30° C. and 60° C. were measured. The results are presented in Table 4 to Table 9.

TABLE 4

Resin compositions [g] of Examples 1 to 6 and evaluation results for workability and impregnability after SMC production

| | Example 1 | Example 2 | Example 3 | Example 4 | Example 5 | Example 6 |
|---|---|---|---|---|---|---|
| jER828 | 100 | 100 | 100 | 100 | 100 | 100 |
| Vinyl polymer particles A | 30 | | | 15 | | |
| Vinyl polymer particles B | | 30 | | 15 | 15 | |
| Vinyl polymer particles C | | | 30 | | | 15 |
| DICY15 | 8 | 8 | 8 | 8 | 8 | 8 |
| OMICURE 24 | 5 | 5 | 5 | 5 | 5 | 5 |
| FB-962 | 1 | 1 | 1 | 1 | 1 | 1 |
| 30° C. viscosity [Pa·s] | 20.9 | 21.8 | 20.7 | 13.7 | 14.9 | 13 |
| 60° C. viscosity [Pa·s] | 1.5 | 1.5 | 1.1 | 0.8 | 0.8 | 0.7 |
| Thickening temperature [° C.] | 80 | 80 | 90 | 80 | 80 | 90 |
| Attained viscosity [Pa·s] | 8723 | 7150 | 3921 | 575 | 462 | 633 |
| Minimum viscosity after thickening [Pa·s] | 585 | 480 | 452 | 42 | 19 | 8 |
| Drapability | ○ | ○ | ○ | ○ | ○ | ○ |
| Film mold releasability | ⊙ | ⊙ | ⊙ | ⊙ | ⊙ | ⊙ |
| Tackiness | ⊙ | ⊙ | ⊙ | ⊙ | ⊙ | ⊙ |
| Impregnability | ○ | ○ | ○ | ○ | ○ | ○ |
| Drapability after two weeks (storage stability) | ○ | ○ | ○ | ○ | ○ | ○ |

TABLE 5

Resin compositions [g] of Examples 7 to 12 and evaluation results for workability and impregnability after SMC production

| | Example 7 | Example 8 | Example 9 | Example 10 | Example 11 | Example 12 |
|---|---|---|---|---|---|---|
| jER828 | 100 | 100 | 100 | 100 | 100 | 100 |
| Vinyl polymer particles D | 30 | 30 | 30 | 30 | 30 | 25 |
| DICY15 | 8 | 8 | 8 | 8 | 8 | 8 |
| OMICURE 24 | 5 | 5 | 5 | 5 | 5 | 5 |
| FB-962 | 0.5 | 1 | 5 | 10 | 0 | 0.5 |
| 30° C. viscosity [Pa·s] | 21.7 | 21.4 | 21.4 | 42.6 | 20.3 | 24.6 |
| 60° C. viscosity [Pa·s] | 1.2 | 1.1 | 1.2 | 1.1 | 1.1 | 0.9 |
| Thickening temperature [° C.] | 80 | 80 | 80 | 80 | 80 | 80 |
| Attained viscosity [Pa·s] | 3790 | 3724 | 3820 | 4589 | 3847 | 1914 |
| Minimum viscosity after thickening [Pa·s] | 222 | 231 | 204 | 176 | 243 | 219 |
| Drapability | ○ | ○ | ○ | ○ | ○ | ○ |
| Film mold releasability | ⊙ | ⊙ | ⊙ | ⊙ | ⊙ | ⊙ |
| Tackiness | ⊙ | ⊙ | ⊙ | ⊙ | ⊙ | ⊙ |
| Impregnability | ○ | ○ | ○ | ○ | ○ | ○ |
| Drapability after two weeks (storage stability) | ○ | ○ | ○ | ○ | ○ | ○ |

TABLE 6

Resin compositions [g] of Examples 13 to 18 and evaluation results for workability and impregnability after SMC production

|  | Example 13 | Example 14 | Example 15 | Example 16 | Example 17 | Example 18 |
|---|---|---|---|---|---|---|
| jER828 | 100 | 100 | 100 | 100 | 100 | 100 |
| Vinyl polymer particles D | 25 | 20 | 20 | 10 | 10 | 10 |
| DICY15 | 8 | 8 | 8 | 8 | 8 | 8 |
| OMICURE 24 | 5 | 5 | 5 | 5 | 5 | 5 |
| FB-962 | 1 | 0.5 | 1 | 1 | 5 | 10 |
| 30° C. viscosity [Pa · s] | 24.3 | 19.9 | 20.1 | 14.6 | 20.2 | 25.7 |
| 60° C. viscosity [Pa · s] | 0.9 | 0.8 | 0.8 | 1.6 | 0.6 | 0.6 |
| Thickening temperature [° C.] | 80 | 80 | 80 | 80 | 80 | 80 |
| Attained viscosity [Pa · s] | 1953 | 1013 | 1001 | 164 | 183 | 162 |
| Minimum viscosity after thickening [Pa · s] | 215 | 89 | 86 | 2 | 4 | 3 |
| Drapability | ○ | ○ | ○ | ○ | ○ | ○ |
| Film mold releasability | ⊙ | ⊙ | ⊙ | ⊙ | ⊙ | ⊙ |
| Tackiness | ⊙ | ⊙ | ⊙ | ⊙ | ⊙ | ⊙ |
| Impregnability | ○ | ○ | ○ | ○ | ○ | ○ |
| Drapability after two weeks (storage stability) | ○ | ○ | ○ | ○ | ○ | ○ |

TABLE 7

Resin compositions [g] of Examples 19 to 25 and evaluation results for workability and impregnability after SMC production

|  | Example 19 | Example 20 | Example 23 | Example 24 | Example 25 |
|---|---|---|---|---|---|
| jER828 | 100 | 100 | 100 | 100 | 100 |
| Vinyl polymer particles D | 30 | 30 | 25 | 20 | 10 |
| DICY15 | 8 | 8 | 8 | 8 | 8 |
| OMICURE 24 | 5 | 5 | 5 | 5 | 5 |
| INT-1882 | 2 | 4 |  |  |  |
| 30° C. viscosity [Pa · s] | 20.7 | 19.9 | 21.7 | 21.4 | 21.4 |
| 60° C. viscosity [Pa · s] | 1.3 | 1.1 | 1.2 | 1.1 | 1.2 |
| Thickening temperature [° C.] | 80 | 80 | 80 | 80 | 80 |
| Attained viscosity [Pa · s] | 3819 | 3804 | 1965 | 1040 | 164 |
| Minimum viscosity after thickening [Pa · s] | 241 | 236 | 272 | 84 | 2 |
| Drapability | ○ | ○ | ○ | ○ | ○ |
| Film mold releasability | ⊙ | ⊙ | ⊙ | ○ | ○ |
| Tackiness | ⊙ | ⊙ | ○ | ○ | ○ |
| Impregnability | ○ | ○ | ○ | ○ | ○ |
| Drapability after two weeks (storage stability) | ○ | ○ | ○ | ○ | ○ |

TABLE 8

Resin compositions [g] of Comparative Examples 1 to 6 and evaluation results for workability and impregnability after SMC production

|  | Comparative Example 1 | Comparative Example 2 | Comparative Example 3 |
|---|---|---|---|
| jER828 | 100 | 100 | 100 |
| Vinyl polymer particles A |  | 5 |  |
| Vinyl polymer particles B |  |  | 5 |
| Vinyl polymer particles C |  |  |  |
| Vinyl polymer particles D |  |  |  |
| DICY15 | 8 |  |  |
| Dicyanex 1400F |  | 4 | 4 |
| OMICURE 24 | 5 |  |  |
| 2MZA-PW |  | 4 | 4 |
| Thickening temperature [° C.] | 80 | 80 | 80 |
| Attained viscosity [Pa · s] | <0.15 | 54 | 49 |
| Minimum viscosity after thickening [Pa · s] | <0.15 | 1 | 1 |
| Drapability | ○ | ○ | ○ |
| Film mold releasability | X | X | X |
| Tackiness | X | X | X |
| Impregnability | ○ | ○ | ○ |
| Drapability after two weeks (storage stability) | ○ | ○ | ○ |

|  | Comparative Example 4 | Comparative Example 5 | Comparative Example 6 |
|---|---|---|---|
| jER828 | 100 | 100 | 100 |
| Vinyl polymer particles A |  |  | 50 |
| Vinyl polymer particles B |  |  |  |
| Vinyl polymer particles C | 5 |  |  |
| Vinyl polymer particles D |  | 5 |  |
| DICY15 |  |  |  |
| Dicyanex 1400F |  | 4 | 4 |
| OMICURE 24 |  |  |  |
| 2MZA-PW | 4 | 4 | 4 |
| Thickening temperature [° C.] | 90 | 80 | 80 |
| Attained viscosity [Pa · s] | 49 | 44 | 27880 |
| Minimum viscosity after thickening [Pa · s] | 2 | 1 | 1292 |
| Drapability | ○ | ○ | ○ |
| Film mold releasability | X | X | ○ |
| Tackiness | X | X | ○ |
| Impregnability | ○ | ○ | ○ |
| Drapability after two weeks (storage stability) | ○ | ○ | ○ |

TABLE 9

Resin compositions [g] of Comparative Examples 7 to 9 and evaluation results for workability and impregnability after SMC production

|  | Comparative Example 7 | Comparative Example 8 | Comparative Example 9 |
|---|---|---|---|
| jER828 | 100 | 100 | 100 |
| Vinyl polymer particles A |  |  |  |
| Vinyl polymer particles B | 50 |  |  |
| Vinyl polymer particles C |  | 50 |  |

TABLE 9-continued

Resin compositions [g] of Comparative Examples 7 to 9 and evaluation results for workability and impregnability after SMC production

| | Comparative Example 7 | Comparative Example 8 | Comparative Example 9 |
|---|---|---|---|
| Vinyl polymer particles D | | | 50 |
| DICY15 | | | |
| Dicyanex 1400F | 4 | 4 | 4 |
| OMICURE 24 | | | |
| 2MZA-PW | 4 | 4 | 4 |
| Thickening temperature [° C.] | 80 | 90 | 80 |
| Attained viscosity [Pa · s] | 53460 | 42101 | 45915 |
| Minimum viscosity after thickening [Pa · s] | 711 | 739 | 691 |
| Drapability | ○ | ○ | ○ |
| Film mold releasability | ○ | ○ | ○ |
| Tackiness | ○ | ○ | ○ |
| Impregnability | ○ | ○ | ○ |
| Drapability after two weeks (storage stability) | ○ | ○ | ○ |

As shown in the tables given above, the SMCs obtained in Examples 1 to 25 had satisfactory tackiness and excellent drapability. Furthermore, since the SMCs have excellent drapability and have the minimum viscosities after thickening in the desired range, it is obvious that the SMCs of Examples 1 to 25 have excellent moldability. The SMCs obtained in Comparative Examples 1 to 9 had very poor film mold releasability, and also exhibited noticeable and strong tackiness.

Examples 21 and 22

[Production of SMC]
Thermosetting resin compositions described in Table 10 were prepared in the same manner as in Example 1. SMCs were produced using these resin compositions, in the same manner as in Example 1 except for the following conditions.
Reinforcing fiber bundles: Manufactured by Mitsubishi Rayon Co., Ltd., carbon fiber bundles "TR50S15L"
Fiber length: About 2.5 cm
Fiber quantity: 1,400 g/cm$^2$
Resin quantity: 1,400 g/cm$^2$
Resin content: 50% by mass
[Molding of Fiber-Reinforced Composite Material]
Each of the SMCs produced according to the section [Production of SMC] described above was heated and pressed in a metal mold at 140° C. for 10 minutes at 8 MPa, and thus a fiber-reinforced composite material having a thickness of 2 mm was produced.
[Bending Test Measurement Method]
Twelve specimens each having a thickness of 2 mm, a length of 60 cm, and a width of 25 cm were produced using the fiber-reinforced composite material obtained in the section [Molding of fiber-reinforced composite material] described above. For these specimens, the flexural strength and flexural modulus were measured using a universal testing machine (manufactured by Instron, Inc., INSTRON (registered trademark) 4465) equipped with a 5-kN load cell, under the conditions of an indenter R=5.0R, support R=3.2R, and L/D=16, and the average values were determined.
[Method for Measuring Glass Transition Temperature]
A specimen having a thickness of 2 mm, a length of 55 mm, and a width of 12.7 mm was produced using the fiber-reinforced composite material obtained in the section [Molding of fiber-reinforced composite material] described above. For this specimen, Tg and tan δ max were measured using a tester, ARES-RDA (manufactured by TA Instruments, Inc.), at a rate of temperature increase of 5° C./min, a frequency of 1 Hz, a strain of 0.05%, and a measurement temperature range of room temperature to 180° C.

[Evaluation of Curing Time]
An evaluation of the curing time of a thermosetting resin composition was performed using a differential scanning calorimeter (DSC), "Q1000" manufactured by TA Instruments, Inc. A thermosetting resin composition was weighed, packed, and sealed in an aluminum pan for exclusive use for the apparatus, and thus a sample was produced. Regarding the measurement conditions, the temperature control program was operated so as to increase the temperature from 30° C. to 140° C. at a rate of 200° C./min, and then to maintain the temperature constant at 140° C. for 30 minutes. Measurement of the calorific value of the thermosetting resin composition at a series of control temperatures was performed. Then, the difference between the time point at which the temperature reached 140° C. and the time point at which the calorific value reached zero was calculated as the curing time, and an evaluation was performed. However, the calorific value was rounded off at the third decimal place.

[Evaluation Results]
The fiber-reinforced composite material obtained in Example 21 had a flexural strength of 224 MPa, a flexural modulus of 20 GPa, a Tg of 107° C., and a tan δ max of 120° C. The fiber-reinforced composite material obtained in Example 22 had a flexural strength of 273 MPa, a flexural modulus of 20 GPa, a Tg of 121° C., and a tan δ max of 141° C.

The curing times for the thermosetting resin compositions measured according to the section [Evaluation of curing time] described above were 8 minutes and 27 seconds for Example 21, and 7 minutes and 51 seconds for Example 22. The thermosetting resin compositions were resin compositions that could be rapidly cured.

[Table 10]

TABLE 10

Mechanical characteristics of SMC composites

| | Example 21 | Example 22 |
|---|---|---|
| jER828 | 100 | 100 |
| Vinyl polymer particles D | 30 | 30 |
| DICY15 | 8 | 8 |
| OMICURE 24 | 5 | 5 |
| INT-1882 | 4 | 0 |
| Carbon fibers | TR50S15L | TR50S15L |
| Vf [%] | 37 | 41 |
| Strength [MPa] | 224 | 273 |
| Elastic modulus [GPa] | 20 | 20 |
| Tg [° C.] | 107 | 121 |
| tan δ max | 123 | 141 |
| Curing time [min] | 8.45 | 7.85 |
| Drapability | ○ | ○ |
| Film mold releasability | ⊙ | ⊙ |
| Tackiness | ○ | ⊙ |
| Impregnability | ○ | ○ |
| Drapability after two weeks (storage stability) | ○ | ○ |
| Tackiness after two weeks (storage stability) | ⊙ | ⊙ |

Examples 26 to 32, and Comparative Examples 10 to 15

[Production of Resin Plate]

The thermosetting resin compositions described in Tables 11 to 13 were prepared in the same manner as in Example 1.

70 to 90 g of each of the thermosetting resin compositions thus obtained was defoamed at low pressure, subsequently the thermosetting resin composition was sandwiched between glass plates together with a TEFLON (registered trademark) spacer having a thickness of 2 mm, and the perimeter was clamped with clips. This was placed at the center of an oven (DP-43, Yamato Scientific Co., Ltd.) that had been maintained at 0° C., and a thermocouple was mounted on the surface of the glass plate. When the temperature of the thermocouple reached 70° C., the temperature was raised to 140° C. at a rate of 10° C./min, and the temperature was maintained at 140° C. for 40 minutes. Subsequently, the temperature was cooled to room temperature, and thus a resin plate was obtained.

[Bending Test Measurement Method]

A specimen having a length of 60 mm and a width of 8 mm was cut out from the resin plate obtained in the section [Production of resin plate] described above, and the cut surface was polished with sandpaper #1200. Six pieces of this specimen were prepared. For all of the specimens, each specimen was bent under the conditions of a ratio of the distance between supports (L) and the thickness (D) of the specimen, L/D, of 16 and a crosshead speed of 2.0 mm/min, using a three-point bending tool (indenter R=3.2 mm, support R=1.6 mm) in an environment of a temperature of 23° C. and a humidity of 50% RH, and the flexural strength, the flexural modulus, and the breaking strain were measured using a universal testing machine (manufactured by Instron, Inc., INSTRON (registered trademark) 4465) and an analytic software program, BLUEHILL. Meanwhile, the average value of the measured values of the six specimens was designated as the measured value.

The resin flexural strength, the resin flexural modulus, and the breaking strain thus obtained are expressed as relative values obtainable when the values of the resin flexural strength, the resin flexural modulus, and the breaking strain in the case of using a thermosetting resin composition containing 30 parts by mass of vinyl polymer particles with respect to 100 parts by mass of an epoxy resin (that is, Examples 28, 29, and 32) are respectively taken as 100, and these values are described in Tables 11 to 13 as the strength retention ratio, the elastic modulus retention ratio, and the breaking strain retention ratio.

[Method for Measuring Glass Transition Point]

A resin plate having a thickness of 2 mm obtained in the section [Production of resin plate] described above was processed into a specimen (length 55 mm×width 12.5 mm), and log G' was plotted against temperature using a rheometer (product name: ARES-RDATA, manufactured by TA Instruments, Inc.), at a measurement frequency of 1 Hz and a rate of temperature increase of 5° C./min. The temperature at the intersection between the approximation straight line of a plateau region of log G' and the approximation straight line of a region in which G' underwent transition, was designated as the glass transition temperature (G'-Tg).

TABLE 11

|  | Comparative Example 10 | Example 26 | Example 27 | Example 28 | Comparative Example 11 |
|---|---|---|---|---|---|
| jER828 | 100 | 100 | 100 | 100 | 100 |
| Dicyanex 1400F | 4 | 4 | 4 | 4 | 4 |
| 2MZA-PW | 4 | 4 | 4 | 4 | 4 |
| Vinyl polymer particles A | 5 | 10 | 20 | 30 | 50 |
| Strength retention ratio [%] | 110 | 113 | 110 | 100 | 87 |
| Elastic modulus retention ratio [%] | 98 | 102 | 114 | 100 | 111 |
| Breaking strength retention ratio [%] | 141 | 147 | 115 | 100 | 75 |
| Resin plate G' - Tg [° C.] | 166 | 166 | 163 | 152 | 145 |

TABLE 12

|  | Comparative Example 12 | Example 29 | Comparative Example 13 |
|---|---|---|---|
| jER828 | 100 | 100 | 100 |
| Dicyanex 1400F | 4 | 4 | 4 |
| 2MZA-PW | 4 | 4 | 4 |
| Vinyl polymer particles B | 5 | 30 | 50 |
| Strength retention ratio [%] | 122 | 100 | 91 |
| Elastic modulus retention ratio [%] | 94 | 100 | 101 |
| Breaking strain retention ratio [%] | 142 | 100 | 87 |
| Resin plate G' - Tg [° C.] | 168 | 116 | 110 |

TABLE 13

|  | Comparative Example 14 | Example 30 | Example 31 | Example 32 | Comparative Example 15 |
|---|---|---|---|---|---|
| jER828 | 100 | 100 | 100 | 100 | 100 |
| Dicyanex 1400F | 4 | 4 | 4 | 4 | 4 |
| 2MZA-PW | 4 | 4 | 4 | 4 | 4 |
| Vinyl polymer particles D | 5 | 10 | 15 | 30 | 50 |
| Strength retention ratio [%] | 99 | 100 | 98 | 100 | 81 |
| Elastic modulus retention ratio [%] | 91 | 96 | 87 | 100 | 99 |
| Breaking strength retention ratio [%] | 110 | 101 | 109 | 100 | 77 |
| Resin plate G' - Tg [° C.] | 171 | 175 | 173 | 118 | 112 |

<Examples Related to Second Invention>

The second invention will be specifically explained by way of Examples according to the second invention; however, the second invention is not intended to be limited to these Examples.

(Component (F))

Bisphenol A type liquid epoxy resin (manufactured by Mitsubishi Chemical Corp., product name "jER828")

Tetrafunctional glycidylamine type epoxy resin (manufactured by Mitsubishi Chemical Corp., product name "jER604")

Phenol novolac type solid epoxy resin (manufactured by DIC Corp., product name "N-775")

Phenol novolac type liquid epoxy resin (manufactured by Mitsubishi Chemical Corp., product name "jER152")

Bisphenol A type solid epoxy resin (manufactured by Mitsubishi Chemical Corp., product name "jER1001")

Modified epoxy resin

A reaction product between a bisphenol A type liquid epoxy resin (manufactured by Mitsubishi Chemical Corp., product name "jER828") and 4,4'-diaminodiphenylsulfone. This is a product obtained by mixing a bisphenol A type liquid epoxy resin (manufactured by Mitsubishi Chemical Corp., product name "jER828") with 4,4'-diaminodiphenylsulfone (manufactured by Wakayama Seika Kogyo Co., Ltd., trade name: SEIKACURE S) at a mass ratio of 100/9 at room temperature, and then mixing and heating the mixture at 150° C. The epoxy equivalent of the modified epoxy resin is 266 g/eq.

(Component (G))

Dicyandiamide (manufactured by Air Products and Chemicals, Inc., product name "Dicyanex 1400F")

(Component (H))

2,4-Diamino-6-[2'-methylimidazolyl-(1')]-ethyl-s-triazine (manufactured by Shikoku Chemicals Corp., product name "2MZA-PW")

2,4-Diamino-6-[2'-methylimidazolyl-(1')]-ethyl-s-triazine (manufactured by Shikoku Chemicals Corp., product name "2MZ-A")

2-Phenyl-4-methylimidazole (manufactured by Shikoku Chemicals Corp., "2P4MZ")

2-Phenylimidazole (manufactured by Shikoku Chemicals Corp., "2PZ-PW")

2-Phenyl-4-methyl-5-hydroxymethylimidazole (manufactured by Shikoku Chemicals Corp., product name "2P4MHZ-PW")

2-Phenyl-4,5-dihydroxymethylimidazole (manufactured by Shikoku Chemicals Corp., product name "2PHZ-PW")

1-Cyanoethyl-2-phenylimidazole (manufactured by Shikoku Chemicals Corp., product name "2PZ-CN")

(Component (I): Production of Vinyl Polymer Particles E and F)

Vinyl polymer particles E and F were produced under the following conditions.

Pure water was introduced into a 2-liter, four-necked flask equipped with a thermometer, a nitrogen gas inlet tube, a stirring rod, a dropping funnel, and a cooling tube. The weights of pure water used to produce the various vinyl polymer particles were as indicated in the second row of Table 14. Next, the flask was sufficiently ventilated with nitrogen gas for 30 minutes, and any dissolved oxygen in the pure water was purged. After the ventilation with nitrogen gas was stopped, the temperature was raised to 80° C. while the water was stirred at 200 rpm. At the time point where the internal temperature had reached 80° C., predetermined amounts of a monomer mixture (M1), potassium persulfate as an initiator, and pure water were respectively introduced into the flask, and polymerization was carried out for one hour. Subsequently, a predetermined amount of a monomer mixture (M2) was introduced into the flask by dropwise addition.

Next, after the heat generation caused by polymerization of the monomer mixture (M2) had ceased, the reaction mixture was maintained for one hour, and a predetermined amount of a monomer mixture (M3) was introduced into the flask. After the introduction of the monomer mixture (M3), stirring was continued for one hour at 80° C., and thereby a polymer particle dispersion liquid of vinyl polymer particles of each kind was obtained. The polymer particle dispersion liquid of the vinyl polymer particles was spray-dried (inlet temperature/outlet temperature=150° C./65° C., speed of disc rotation: 25,000 rpm) using an L-8 type spray dryer (manufactured by Ohkawara Kakohki Co., Ltd.), and thus vinyl polymer particles were obtained.

TABLE 14

| | | | Vinyl polymer particles E | Vinyl polymer particles F |
|---|---|---|---|---|
| Core component | Pure water (g) | | 584 | 544 |
| | Monomer mixture (M1) | MMA (g) | 26.1 | 26.1 |
| | | n-BMA (g) | 19.9 | 19.9 |
| | | KPS (g) | 0.4 | 0.4 |
| | Pure water (g) | | 19.6 | 16 |
| | Monomer mixture (M2) | MMA (g) | 205.5 | 334.1 |
| | | n-BMA (g) | 194.5 | — |
| | | t-BMA (g) | — | 316.1 |
| | | 2-HEMA (g) | — | 21.7 |
| | | PELEX OT-P (g) | 3.6 | 6.1 |
| | Pure water (g) | | 200 | 251.2 |
| Shell component | Monomer mixture (M3) | MMA (g) | 382.7 | 77 |
| | | MAA (g) | 17.3 | — |
| | | 2-HEMA (g) | — | 3 |
| | | PELEX OT-P (g) | 4 | 0.8 |
| | | EMULGEN 106 (g) | 4 | — |
| | Pure water (g) | | 200 | 28 |
| Time for dropwise addition of monomer mixture (M2) (min) | | | 150 | 270 |
| Time for dropwise addition of monomer mixture (M3) (min) | | | 150 | 30 |
| Shell Tg [° C.] | | | 109.1 | 102.0 |
| Core Tg [° C.] | | | 58.7 | 100.4 |
| Primary particle size [nm] | | | 700 | 700 |
| Secondary particle size [μm] | | | 70 | 70 |

The abbreviations in Table 14 represent the following compounds.

MMA: Methyl methacrylate
n-BMA: n-Butyl methacrylate
t-BMA: t-Butyl methacrylate
2-HEMA: 2-Hydroxyethyl methacrylate
MAA: Methacrylic acid
KPS: Potassium persulfate
PELEX OT-P: Sodium dialkyl sulfosuccinate (trade name, manufactured by Kao Corp.)
EMULGEN 106: Polyoxyethylene lauryl ether (trade name, manufactured by Kao Corp.)

(Other Additive)

Fluorine-based polymer (trade name "FB-962", Daikin Industries, Ltd.)

<Preparation of Master Batch>

Master batches of Component (G), Component (H), and Component (I) as powders were produced.

First, a bisphenol A type epoxy resin in Component (F) and each of Component (G), Component (H), and Component (I) were weighed in a vessel at a mass ratio of 1:1, and the components were stirred and mixed. These mixtures were further thoroughly mixed with a three-roll mill, and thus master batches of Component (G), Component (H), and Component (I) were respectively prepared.

<Method for Preparing Epoxy Resin Composition>

A predetermined amount of Component (F) was dispensed into a glass flask, and the content was stirred using a stirring blade in a water bath at about 90° C. until the content became uniform. Subsequently, the temperature of the water bath was lowered to 40° C., and predetermined amounts of the master batches of Component (G), Component (H), and Component (I) and other additives were dispensed into the glass flask. The components were stirred using a stirring blade until the mixture became uniform. Thus, an epoxy resin composition was prepared.

<Test for Curing of Epoxy Resin Composition in Short Time Period>

Isothermal DSC measurement was performed using a differential scanning calorimeter (DSC), "Q1000", manufactured by TA Instruments, Inc.

First, an epoxy resin composition was weighed in a standard aluminum hermetic pan for the apparatus, and the pan was covered with a standard aluminum lid for the apparatus. Thus, a sample was produced. Regarding the set conditions for the analyzer, the temperature control program was operated so as to increase the temperature from 30° C. to 140° C. at a rate of 200° C./min, and then to maintain the temperature constant at 140° C. for 30 minutes. Thus, a DSC exothermic curve of the resin composition was obtained at a series of controlled temperatures. In a graph obtained by plotting time on the horizontal axis (1 in the diagram: time) and the heat flow rate on the vertical axis (2 in the diagram: heat flow rate) as shown in FIG. 1, curability of the epoxy resin composition was evaluated based on the time at the intersection (5 in the diagram: inflection point) between a tangent line at the point where the gradient of the curve on which the heat flow rate on the DSC exothermic curve progresses toward convergence becomes the maximum (3 in the diagram: point at which the gradient of the curve becomes the maximum), and a tangent line at the point where heat generation caused by a curing reaction is finished (4 in the diagram: finish point).

Evaluation Criteria:

◯: When the time at the inflection point is within 6 minutes from the initiation of measurement, it is determined that curing in a short time period is possible.

x: When the time at the inflection point is longer than 6 minutes from the initiation of measurement, it is determined that curing in a short time period is impossible.

<Test on Storage Stability of Epoxy Resin Composition>

2 g of an epoxy resin composition was dispensed on an aluminum pan, and the epoxy resin composition was stored for two weeks at 23° C. After the lapse of two weeks, an evaluation on storage stability was performed from the fluidity and the cured state of the epoxy resin composition in the aluminum pan.

Evaluation Criteria:

◯: Even after the lapse of two weeks, fluidity of the resin composition is not lost, and it is determined that the resin composition has excellent storage stability.

x: After the lapse of two weeks, if the fluidity of the resin composition is deteriorated, or the resin composition is in a semicured state, it is determined that the resin composition has poor storage stability.

<Evaluation of Thickening Properties of Epoxy Resin Composition>

The thickening properties of an epoxy resin composition were evaluated based on the measurement of viscosity using a rheometer, VAR-100 (manufactured by Reologica Instruments AB).

Measurement Conditions:
Measurement mode: Constant stress, stress value 300 Pa
Frequency: 1.59 Hz
Plate diameter: 25 mm
Plate type: Parallel plates
Plate gap: 0.5 mm.

The temperature of the rheometer was set in advance to 80° C., and after it was confirmed that the temperature inside the oven of the rheometer became steady at 80° C., an epoxy resin composition was dispensed on a measurement plate. The gap was adjusted, the temperature was stabilized again at 80° C., and then viscosity was measured under the conditions described above (80° C. initial viscosity). Subsequently, viscosity after 30 minutes was measured (80° C. viscosity after 30 minutes), and from the difference between the two values, the presence or absence of rapid thickening of the epoxy resin composition was checked.

<Production of Cured Resin Plate>

An epoxy resin composition was defoamed in a vacuum, and was inserted between two sheets of glass plates each having a thickness of 4 mm, with a polytetrafluoroethylene spacer having a thickness of 2 mm being interposed therebetween. The inserted epoxy resin composition was heated in a hot air circulation type constant temperature furnace for 10 minutes under the conditions that the temperature at the glass surface was kept at 140° C., and then the epoxy resin composition was cooled. Thus, a cured resin plate was obtained.

<Test on Three-Point Bending of Cured Resin Plate>

A test on three-point bending of the cured resin plate was performed using a universal testing machine (manufactured by Instron, Inc., INSTRON (registered trademark) 4465).

Six sheets of specimens each having a width of 8 mm and a length of 60 mm were cut out from the cured resin plate obtained in the section <Production of cured resin plate> described above, and the flexural strength, flexural modulus, and flexural rupture elongation were measured using INSTRON (registered trademark) 4465. The average values of the six specimens were determined. The test conditions were such that the crosshead speed was 2 mm/min, and the span distance was obtained by actually measuring the thickness of the cured resin plate and calculating the distance from (thickness×16) mm.

<Test for Measuring Heat Resistance of Epoxy Resin Composition>

The glass transition temperature of the cured resin plate was measured using a rheometer, "ARES-RDA", manufactured by TA Instruments, Inc.

The cured resin plate obtained in the section <Production of cured resin plate> described above was processed into a specimen (length 55 mm×width 12.5 mm), and log G' was plotted against temperature at a measurement frequency of 1 Hz and a rate of temperature increase of 5° C./min. The temperature at the intersection between the approximation straight line of a plateau region of log G' and the approximation straight line of a region in which G' decreased rapidly, was designated as the glass transition temperature (G'-Tg).

Evaluation Criteria:

◯: In a case in which the glass transition temperature is 140° C. or higher, it is determined that the epoxy resin composition has excellent heat resistance.

x: In a case in which the glass transition temperature is below 140° C., it is determined that the epoxy resin composition has poor heat resistance.

<Method for Producing SMC>

An epoxy resin composition was uniformly applied on a polyethylene film such that the coating amount would be 750 g/m², and two sheets of resin films were produced. On the resin composition-coated surface of one of the two sheets of resin films, carbon fiber bundles (TR50S15L) that had been chopped to a length of about 2.5 cm were randomly sprinkled from right above the resin film such that the fiber quantity would be 1,500 g/m². The other sheet of resin film was pasted thereon such that the resin composition-coated surface would face the sprinkled carbon fibers, and this assembly was heated and pressed using a fusing press machine (manufactured by Asahi Corp., JR-600S, treated length 1340 mm, the set pressure was the cylinder pressure). Thus, the carbon fiber layer was impregnated with the epoxy resin composition, and a SMC precursor was obtained. The set temperature of the fusing press machine was 85° C., and the set pressure was 0.01 MPa. Subsequently, the SMC precursor thus obtained was introduced into an oven at 80° C. for 30 minutes, the epoxy resin composition was thickened, and thus a SMC was obtained.

<Drapability>

Drapability at room temperature (about 23° C.) of the SMC obtained in the section <Method for producing SMC> described above was evaluated based on tactile sensation. The evaluation criteria are shown below.

Evaluation Criteria:

◯: The SMC has flexibility appropriate for the operation of placement and lamination in a forming mold, and has satisfactory handleability.

x: The SMC has no flexibility appropriate for the operation of placement and lamination in a forming mold, and has poor handleability.

<Impregnability>

A SMC obtained in the section <Method for producing SMC> described above was cut at room temperature (about 23° C.), and the state of impregnation of the epoxy resin composition in the carbon fiber layer at a cross-section was checked by visual inspection. The evaluation criteria are shown below.

Evaluation Criteria:

◯: The carbon fiber layer is entirely impregnated with the epoxy resin composition.

x: Dry carbon fiber bundles are found here and there at the cut surface, and impregnation is unsatisfactory.

<Film Peelability>

The polyethylene film attached to the SMC obtained in the section <Method for producing SMC> described above was manually peeled off at room temperature (about 23° C.), and film peelability was evaluated. The evaluation criteria are shown below.

Evaluation Criteria:

◯: The film could be peeled off.

x: Peeling of the film was difficult.

<Tackiness>

The polyethylene film attached to the SMC obtained in the section <Method for producing SMC> described above was manually peeled off at room temperature (about 23° C.), and the feeling of touch at the SMC surface was evaluated. The evaluation criteria are shown below.

Evaluation Criteria:

⊙: The surface has adequate tackiness.

◯: The operation of placement and lamination in a forming mold can be carried out; however, the surface has slightly strong tackiness.

x: The surface has strong tackiness, and the operation of placement and lamination in a forming mold is difficult.

<Short-Time Curability in Press Molding>

The SMC obtained in the section <Method for producing SMC> described above was press molded under the following conditions, and a molded article (fiber-reinforced composite material) having a thickness of 2 mm was produced. Short-time curability was evaluated using this molded article.

Pressing Conditions:

Mold shape: Square flat plate mold

Mold temperature: About 140° C. (heated so that the average value of the temperatures at the four corners of the mold would be about 140° C.)

Molding pressure: 8 MPa

Molding time: 5 minutes

Evaluation Criteria:

◯: The SMC was sufficiently cured under the pressing conditions described above, and any deformation of the molded article (fiber-reinforced composite material) at the time of being taken out from the mold was not observed.

x: Curing occurred insufficiently under the pressing conditions described above, and the molded article (fiber-reinforced composite material) was deformed when the molded article was taken out from the mold.

<Test for Measuring Heat Resistance of Press Molded Cured Product>

Heat resistance of the molded article (fiber-reinforced composite material) obtained in the section <Short-time curability in press molding> described above was evaluated by the same method and same criteria as those used in the section <Test for measuring heat resistance of epoxy resin composition>.

Evaluation Criteria:

◯: In a case in which the glass transition temperature is 140° C. or higher, it is determined that the molded article has excellent heat resistance.

x: In a case in which the glass transition temperature is below 140° C., it is determined that the molded article has poor heat resistance.

<Reference Example 9: Particle Size of Component (H)>

2MZ-A and 2MZA-PW, both being Component (H), were respectively dispersed in air, and the volume-based particle size distribution was analyzed by a laser diffraction method using AEROTRAC SPR MDEL:7340 manufactured by Nikkiso Co., Ltd. The particle size at the cumulative frequency of 50% (D50) in the particle size distribution was designated as the average particle size of each compound.

TABLE 15

| | | Average particle size [μm] | | |
|---|---|---|---|---|
| | | D10 | D50 | D90 |
| Component (H) | 2MZ-A | 20.95 | 56.62 | 125.28 |
| | 2MZA-PW | 2.41 | 10.02 | 64.96 |

Examples 33 to 45, and Comparative Examples 16 to 22

Epoxy resin compositions including the various components described in Table 16 and Table 17 were prepared according to the <Method for preparing epoxy resin composition> described above. A test on short-time curability and a test on storage stability were performed using the epoxy resin compositions thus obtained. Next, cured resin plates were produced according to the section <Production of cured resin plate> described above, and a three-point bending test and a heat resistance measurement test were performed using these resin plates. The results are presented in Table 16 and Table 17.

TABLE 16

|  |  |  | Example 33 | Example 34 | Example 35 | Example 36 | Example 37 | Example 38 | Example 39 |
|---|---|---|---|---|---|---|---|---|---|
| Component (F) | | jER828 | 100 | 100 | 100 | 100 | 100 | 100 | 85 |
| | | jER604 | | | | | | | 15 |
| | | N-775 | | | | | | | |
| | | jER1001 | | | | | | | |
| | | Modified epoxy resin | | | | | | | |
| Component (G) | | DICYANEX1400F | 2 | 3 | 4 | 6 | 8 | 4 | 2 |
| Component (H) | | 2MZA-PW | 4 | 4 | 4 | 4 | 4 | 8 | 4 |
| | | 2MZ-A | | | | | | | |
| | | 2P4MZ | | | | | | | |
| | | 2PZ-PW | | | | | | | |
| | | 2P4MHZ-PW | | | | | | | |
| | | 2PHZ-PW | | | | | | | |
| | | 2PZ-CN | | | | | | | |
| Epoxy resin composition | Evaluation of short-time curing | Short-time curing | ○ | ○ | ○ | ○ | ○ | ○ | ○ |
| | | Time to reach inflection point (min) | 5.1 | 5.2 | 5.5 | 5.2 | 4.9 | 4.8 | 5.1 |
| | Evaluation of storage stability | | ○ | ○ | ○ | ○ | ○ | ○ | ○ |
| Cured resin plate | Evaluation of three-point bending | Flexural strength (MPa) | 115.5 | 133.9 | 147.2 | 153.5 | 166.8 | 147.1 | 138.2 |
| | | Flexural modulus (GPa) | 3.3 | 3.0 | 3.4 | 3.4 | 3.6 | 3.5 | 3.2 |
| | | Flexural rupture elongation (%) | 4.9 | 8.6 | 8.5 | 10.3 | 12.1 | 10.3 | 7.1 |
| | Evaluation of heat resistance | Evaluation of heat resistance | ○ | ○ | ○ | ○ | ○ | ○ | ○ |
| | | Tg G'-Tg (° C.) | 169 | 175 | 170 | 153 | 144 | 142 | 170 |
| | | Tg tan delta (° C.) | 192 | 192 | 184 | 176 | 162 | 161 | 198 |

|  |  |  | Example 40 | Example 41 | Example 42 | Example 43 | Example 44 | Example 45 |
|---|---|---|---|---|---|---|---|---|
| Component (F) | | jER828 | 85 | 85 | 75 | 75 | 80 | 80 |
| | | jER604 | | | | | | 20 |
| | | N-775 | | | | | 20 | |
| | | jER1001 | | 15 | | 25 | | |
| | | Modified epoxy resin | 15 | | 25 | | | |
| Component (G) | | DICYANEX1400F | 4 | 4 | 4 | 4 | 4 | 4 |
| Component (H) | | 2MZA-PW | 4 | 4 | 4 | 4 | 4 | 4 |
| | | 2MZ-A | | | | | | |
| | | 2P4MZ | | | | | | |
| | | 2PZ-PW | | | | | | |
| | | 2P4MHZ-PW | | | | | | |
| | | 2PHZ-PW | | | | | | |
| | | 2PZ-CN | | | | | | |
| Epoxy resin composition | Evaluation of short-time curing | Short-time curing | ○ | ○ | ○ | ○ | ○ | ○ |
| | | Time to reach inflection point (min) | 5.7 | 5.3 | 5.4 | 5.5 | 5.2 | 5.1 |
| | Evaluation of storage stability | | ○ | ○ | ○ | ○ | ○ | ○ |
| Cured resin plate | Evaluation of three-point bending | Flexural strength (MPa) | 145.8 | 140.4 | 150.0 | 142.3 | 156.1 | 155.1 |
| | | Flexural modulus (GPa) | 3.3 | 3.3 | 3.4 | 3.4 | 3.5 | 3.4 |
| | | Flexural rupture elongation (%) | 8.6 | 9.5 | 8.9 | 10.2 | 6.7 | 7.9 |

TABLE 16-continued

|  |  |  |  |  |  |  |  |
|---|---|---|---|---|---|---|---|
| Evaluation of heat resistance | Evaluation of heat resistance | ○ | ○ | ○ | ○ | ○ | ○ |
|  | Tg G'-Tg (° C.) | 168 | 162 | 171 | 143 | 178 | 179 |
|  | Tg tan delta (° C.) | 183 | 173 | 184 | 120 | 196 | 197 |

TABLE 17

|  |  |  | Comparative Example 16 | Comparative Example 17 | Comparative Example 18 | Comparative Example 19 | Comparative Example 20 | Comparative Example 21 | Comparative Example 22 |
|---|---|---|---|---|---|---|---|---|---|
| Component (F) | jER828 |  | 100 | 100 | 100 | 100 | 100 | 100 | 100 |
|  | jER604 |  |  |  |  |  |  |  |  |
|  | N-775 |  |  |  |  |  |  |  |  |
|  | jER1001 |  |  |  |  |  |  |  |  |
| Component (G) | DICYANEX1400F |  | 6 |  |  | 4 | 2 | 2 | 4 |
| Component (H) | 2MZA-PW |  |  | 6 |  |  |  |  |  |
|  | 2MZ-A |  |  |  | 4 | 4 |  |  |  |
|  | 2P4MZ |  |  |  |  |  | 4.2 |  |  |
|  | 2PZ-PW |  |  |  |  |  |  | 5 |  |
|  | 2P4MHZ-PW |  |  |  |  |  |  |  |  |
|  | 2PHZ-PW |  |  |  |  |  |  |  |  |
|  | 2PZ-CN |  |  |  |  |  |  |  | 4 |
| Epoxy resin composition | Evaluation of short-time curing | Short-time curing | X | X | X | X | X | ○ | ○ |
|  |  | Time to reach inflection point (min) | No heat generation | 6.5 | 8.1 | 10.4 | 11.7 | 4.5 | 5.4 |
|  | Evaluation of storage stability |  | ○ | ○ | ○ | ○ | ○ | X | X |
| Cured resin plate | Evaluation of three-point bending | Flexural strength (MPa) | — | 114.0 | — | 125.2 | — | — | 144.3 |
|  |  | Flexural modulus (GPa) | — | 3.2 | — | 3.3 | — | — | 3.42 |
|  |  | Flexural rupture elongation (%) | — | 4.3 | — | 5.6 | — | — | 8.72 |
|  | Evaluation of heat resistance | Evaluation of heat resistance | — | ○ | — | ○ | — | — | ○ |
|  |  | Tg G'-Tg (° C.) | — | 155 | — | 166 | — | — | 174 |
|  |  | Tg tan delta (° C.) | — | 184 | — | 186 | — | — | 186 |

The resin compositions of Example 33 to Example 45 could all be cured in a short time period, and had excellent storage stability. These Example 33 to Example 45 had a (G'–Tg) value of 140° C. or higher, and it is understood from the results of a DMA analysis that these Examples have high heat resistance.

Meanwhile, as can be seen from the results for Comparative Example 16 to Comparative Example 18, it is understood that even if Component (G) and Component (H) are used singly, curing cannot be achieved in a short time period.

Comparative Example 19 to Comparative Example 22 present the results of replacing Component (H) with another imidazole; however, it is understood that a balance between short-time curing and storage stability is not achieved. When a comparison was made between Example 35 and Comparative Example 19, the difference between the times required for short-time curing was 5 minutes or longer. This is speculated to be due to the influence of the difference in the particle size of Component (H), as can be seen from the average particle sizes indicated in Table 15. That is, it is shown that the particle size of Component (H) significantly affects curing in a short time period.

Examples 46 to 58

Epoxy resin compositions including the various components described in Table 18 were prepared according to the <Method for preparing epoxy resin composition> described above. A test on short-time curing, a test on storage stability, and an evaluation of thickening properties were performed using the epoxy resin compositions thus obtained. Next, cured resin plates were produced according to the section <Production of cured resin plate> described above, and a test for measuring heat resistance was performed using these resin plates.

SMCs were produced according to the <Method for producing SMC> described above, and evaluations of drapability, impregnability, film peelability, tackiness, short-time curability in press molding, and heat resistance of press molded cured product were performed using the SMCs thus obtained. The results are presented in Table 18.

TABLE 18

|  |  |  | Example 46 | Example 47 | Example 48 | Example 49 | Example 50 | Example 51 | Example 52 |
|---|---|---|---|---|---|---|---|---|---|
| Component (F) | | jER828 | 100 | 100 | 100 | 100 | 100 | 80 | 80 |
| | | jER604 | | | | | | 20 | 20 |
| | | N-775 | | | | | | | |
| | | jER1001 | | | | | | | |
| Component (G) | | DICYANEX1400F | 4 | 4 | 4 | 2 | 2 | 4 | 4 |
| Component (H) | | 2MZA-PW | 4 | 4 | 4 | 4 | 4 | 4 | 4 |
| Component (I) | | Vinyl polymer particles E | 20 | 25 | 20 | 20 | 25 | 10 | 20 |
| | | Vinyl polymer particles F | | | | | | | |
| Additive | | FB-962 | 0 | 0.5 | 0.5 | 0.5 | 0.5 | | |
| Epoxy resin composition | Evaluation of short-time curing | Short-time curing | ○ | ○ | ○ | ○ | ○ | ○ | ○ |
| | | Time to reach inflection point (min) | 5.98 | 6.03 | 5.66 | 5.62 | 5.49 | 5.44 | 5.76 |
| | Evaluation of thickening properties | 80° C. initial viscosity (Pa·s) | 0.5 | 0.5 | 0.4 | 0.5 | 0.6 | 0.5 | 0.5 |
| | | 80° C. viscosity after 30 minutes (Pa·s) | 221.4 | 427.0 | 218.4 | 196.5 | 430.0 | 26.9 | 357.1 |
| | | Evaluation of storage stability | ○ | ○ | ○ | ○ | ○ | ○ | ○ |
| Cured resin plate | Evaluation of heat resistance | Evaluation of heat resistance | ○ | ○ | ○ | ○ | ○ | ○ | ○ |
| | | Tg G'- Tg (° C.) | 166 | 160 | 167 | 171 | 171 | 176 | 174 |
| | | Tg tan delta (° C.) | 180 | 175 | 182 | 193 | 190 | 197 | 196 |
| SMC | | Drapability | ○ | ○ | ○ | ○ | ○ | ○ | ○ |
| | | Impregnability | ○ | ○ | ○ | ○ | ○ | ○ | ○ |
| | | Film peelability | ○ | ⊙ | ⊙ | ⊙ | ⊙ | ⊙ | ○ |
| | | Tackiness | ○ | ⊙ | ⊙ | ⊙ | ⊙ | ⊙ | ○ |
| | | Short-time curability in press molding | ○ | ○ | ○ | ○ | ○ | ○ | ○ |
| Press molded cured product | Evaluation of heat resistance | Evaluation of heat resistance | — | — | ○ | ○ | — | — | — |
| | | Tg G'- Tg (° C.) | — | — | 151 | 161 | — | — | — |
| | | Tg tan delta (° C.) | — | — | 169 | 177 | — | — | — |

|  |  |  | Example 53 | Example 54 | Example 55 | Example 56 | Example 57 | Example 58 |
|---|---|---|---|---|---|---|---|---|
| Component (F) | | jER828 | 80 | 80 | 100 | 80 | 80 | 80 |
| | | jER604 | 20 | 20 | | | 20 | |
| | | N-775 | | | | | | 20 |
| | | jER1001 | | | | 10 | | |
| Component (G) | | DICYANEX1400F | 4 | 4 | 4 | 4 | 4 | 4 |
| Component (H) | | 2MZA-PW | 4 | 4 | 4 | 4 | 4 | 4 |
| Component (I) | | Vinyl polymer particles E | 10 | 20 | | | | |
| | | Vinyl polymer particles F | | | 20 | 20 | | |
| Additive | | FB-962 | | | | | | |
| Epoxy resin composition | Evaluation of short-time curing | Short-time curing | ○ | ○ | ○ | ○ | ○ | ○ |
| | | Time to reach inflection point (min) | 5.47 | 5.59 | 5.66 | 5.97 | 5.2 1 | 5.14 |
| | Evaluation of thickening properties | 80° C. initial viscosity (Pa·s) | 0.4 | 0.4 | 0.4 | 0.7 | 0.2 | 0.3 |

TABLE 18-continued

|  |  |  |  |  |  |  |  |  |
|---|---|---|---|---|---|---|---|---|
|  |  | 80° C. viscosity after 30 minutes (Pa·s) | 30.3 | 353.9 | 171.7 | 240.9 | 0.3 | 0.4 |
|  |  | Evaluation of storage stability | ○ | ○ | ○ | ○ | ○ | ○ |
| Cured resin plate | Evaluation of heat resistance | Evaluation of heat resistance | ○ | ○ | ○ | ○ | ○ | ○ |
|  |  | Tg G'-Tg (° C.) | 178 | 176 | 174.08 | 168.16 | 178 | 179 |
|  |  | Tg tan delta (° C.) | 193 | 193 | 184.08 | 177.91 | 196 | 197 |
| SMC |  | Drapability | ○ | ○ | ○ | ○ | ○ | ○ |
|  |  | Impregnability | ○ | ○ | ○ | ○ | ○ | ○ |
|  |  | Film peelability | ○ | ○ | ○ | ○ | X | X |
|  |  | Tackiness | ○ | ○ | ○ | ○ | X | X |
|  |  | Short-time curability in press molding | ○ | ○ | ○ | ○ | — | — |
| Press molded cured product | Evaluation of heat resistance | Evaluation of heat resistance | — | — | — | — | — | — |
|  |  | Tg G'-Tg (° C.) | — | — | — | — | — | — |
|  |  | Tg tan delta (° C.) | — | — | — | — | — | — |

As shown in Table 18, it is understood that a SMC that used an epoxy resin composition including Component (I) also has excellent short-time curability and heat resistance, similarly to the epoxy resin composition that did not include Component (I), which were used in Examples 33 to 45.

In the case of SMCs, as in the case of Example 46 to Example 56, the SMCs that contained vinyl polymer particles E or vinyl polymer particles F could be thickened, and since the SMCs contained additive FB-962, tackiness was suppressed. Thus, a very satisfactory film peeling effect was also obtained. Furthermore, satisfactory results were obtained without having the short-time curability and heat resistance significantly impaired.

INDUSTRIAL APPLICABILITY

According to the first aspect of the invention (first invention), there can be provided a SMC that has a very small possibility of warping, surface sinking, and cracking that are attributed to curing shrinkage of unsaturated polyester resins and the like, which is a problem of conventional SMCs; can have controlled thickening almost without being affected by air temperature and moisture; and does not require a large amount of filler. Furthermore, a SMC that can realize a working environment that is free from foul odor of styrene monomers or the like and health hazard, can be provided.

According to the second aspect of the invention (second invention), a resin composition that can be cured in a short time period, has excellent storage stability, and has high heat resistance is obtained. Also, a SMC and a BMC containing an epoxy resin as a base resin can be provided by incorporating vinyl polymer particles or other additives.

The invention claimed is:

1. A sheet-molding compound comprising a thickened product of a thermosetting resin composition and reinforcing fiber bundles,
wherein the thermosetting resin composition includes:
Component (A): a liquid epoxy resin having a viscosity at 25° C. of 1 Pa·s or higher;
Component (B): an epoxy resin curing agent; and
Component (D): vinyl polymer particles,
the content of the Component (D) is from 10 parts by mass to 30 parts by mass with respect to 100 parts by mass of the total amount of epoxy resins included in the thermosetting resin composition,
the attained viscosity of a thickened product of the thermosetting resin composition is from 150 Pa·s to 20,000 Pa·s, the attained viscosity being a viscosity at 30° C., while the minimum viscosity is from 2 Pa·s to 600 Pa·s, the minimum viscosity being the lowest viscosity obtained when the thickened product of the thermosetting resin composition being at 30° C. is subjected to temperature increase up to 120° C. at a rate of 2° C./min using a rheometer, and
the attained viscosity is higher than the minimum viscosity.

2. The sheet-molding compound according to claim 1, wherein in regard to the Component (D), a dispersion obtainable by dispersing the Component (D) in a bisphenol A type epoxy resin having an epoxy equivalent of 190±6 g/eq has a thickening ratio, $d_1/d_0$ (provided that $d_0$ represents the viscosity obtainable immediately after the preparation of a dispersion obtained by dispersing 30 parts by mass of the Component (D) in 100 parts by mass of the bisphenol A type epoxy resin at 30° C.; and $d_1$ represents the viscosity obtainable after heating the dispersion to 60° C. and maintaining the dispersion for one hour at 60° C. after the heating), of 1.0 or less.

3. The sheet-molding compound according to claim 2, wherein in regard to the Component (D), a dispersion obtainable by dispersing the Component (D) in a bisphenol F type epoxy resin having an epoxy equivalent of 168±8 g/eq has a thickening ratio, $d_1'/d_0'$ (provided that $d_0'$ represents the viscosity obtainable immediately after the preparation of a dispersion obtained by dispersing 30 parts by mass of the Component (D) in 100 parts by mass of the bisphenol F type epoxy resin at 30° C.; and $d_1'$ represents the viscosity obtainable after heating the dispersion to 60° C. and maintaining the dispersion for one hour at 60° C. after the heating), of 1.0 or less.

4. The sheet-molding compound according to claim 1, wherein the viscosity at 30° C. of the thermosetting resin composition is from 1 Pa·s to 50 Pa·s.

5. The sheet-molding compound according to claim 1, wherein the Component (D) is particles formed from an acrylic resin.

6. The sheet-molding compound according to claim 1, wherein the Component (D) is core-shell particles.

7. The sheet-molding compound according to claim 6, wherein the glass transition temperature of the core in the core-shell particles is 30° C. or higher.

8. The sheet-molding compound according to claim 6, wherein the glass transition temperature of the shell in the core-shell particles is 60° C. or higher.

9. The sheet-molding compound according to claim 6, wherein the solubility parameter (SP value) of the shell in the core-shell particles is 20 or higher.

10. The sheet-molding compound according to claim 6, wherein the shell in the core-shell particles is formed from a polymer of at least one monomer selected from the group consisting of an acrylate, a methacrylate, and a carboxylic acid-containing vinyl monomer, and the content of a compound having two or more ethylenically unsaturated groups in the molecule is 0.5% by mass or less of the total amount of the monomers.

11. The sheet-molding compound according to claim 1, wherein the volume average primary particle size of the Component (D) is from 500 nm to 1,000 nm.

12. The sheet-molding compound according to claim 1, wherein the Component (A) is a bisphenol A type epoxy resin.

13. The sheet-molding compound according to claim 1, wherein the thermosetting resin composition further includes Component (C): an epoxy resin curing accelerator.

14. The sheet-molding compound according to claim 1, wherein the thermosetting resin composition further includes Component (E): a mold releasing agent.

15. The sheet-molding compound according to claim 1, wherein the thermosetting resin composition further includes Component (C): an epoxy resin curing accelerator, the Component (B) is dicyandiamide, and the Component (C) is 2,4-bis(3,3-dimethylurea)toluene.

16. The sheet-molding compound according to claim 1, wherein the reinforcing fiber bundles are carbon fiber bundles.

17. A fiber-reinforced composite material, comprising a cured product of the sheet-molding compound according to claim 1.

* * * * *